United States Patent
Hirao

(10) Patent No.: US 9,809,076 B2
(45) Date of Patent: *Nov. 7, 2017

(54) SUSPENSION CONTROL APPARATUS FOR DAMPING OSCILLATION OF A VEHICLE

(71) Applicant: HITACHI AUTOMOTIVE SYSTEMS, LTD., Ibaraki (JP)

(72) Inventor: Ryusuke Hirao, Chiba (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 0 days.

This patent is subject to a terminal disclaimer.

(21) Appl. No.: 15/009,029

(22) Filed: Jan. 28, 2016

(65) Prior Publication Data

US 2016/0159189 A1    Jun. 9, 2016

Related U.S. Application Data

(62) Division of application No. 14/037,914, filed on Sep. 26, 2013, now Pat. No. 9,278,599.

(30) Foreign Application Priority Data

Sep. 28, 2012   (JP) ................................ 2012-218554

(51) Int. Cl.
  *B60G 17/018* (2006.01)
  *B60G 23/00* (2006.01)
  (Continued)

(52) U.S. Cl.
  CPC ....... *B60G 17/0152* (2013.01); *B60G 17/016* (2013.01); *B60G 17/018* (2013.01);
  (Continued)

(58) Field of Classification Search
  CPC ............ B60G 2202/322; B60G 17/016; B60G 2204/4232; B60G 21/00
  (Continued)

(56) References Cited

U.S. PATENT DOCUMENTS 5,193,655 A    3/1993 Sasaki et al.
7,406,371 B2   7/2008 Izawa et al.
(Continued)

FOREIGN PATENT DOCUMENTS

JP    3-49442     5/1991
JP    8-310214    11/1996
(Continued)

OTHER PUBLICATIONS

Office Action dated Jun. 21, 2016 in corresponding Japanese Application No. 2012-218554 (with English translation).

*Primary Examiner* — Mahmoud Ismail
(74) *Attorney, Agent, or Firm* — Wenderoth, Lind & Ponack, L.L.P.

(57) ABSTRACT

A suspension control apparatus includes a damping force adjustable shock absorber disposed between a vehicle body and a wheel of a vehicle and capable of adjusting a damping force to be generated, a vertical movement detection device configured to detect a state regarding a vertical movement of a vehicle, and a controller including: a target damping force calculation section configured to calculate a target damping force based on a detection result of the vertical movement detection device, a correction section configured to calculate a corrected damping force, which is acquired by reducing the target damping force when a relative speed is a low speed between a sprung side and an unsprung side of the damping force adjustable shock absorber, and a control signal output section configured to output the control signal corresponding to the corrected damping force to the damping force adjustable shock absorber.

12 Claims, 14 Drawing Sheets

(51) Int. Cl.
| | |
|---|---|
| *B62C 3/00* | (2006.01) |
| *B62K 25/00* | (2006.01) |
| *G06F 7/00* | (2006.01) |
| *G06F 17/00* | (2006.01) |
| *G06F 19/00* | (2011.01) |
| *B60G 17/015* | (2006.01) |
| *B60G 17/016* | (2006.01) |
| *B60G 17/06* | (2006.01) |
| *B60G 17/08* | (2006.01) |
| *F16F 9/34* | (2006.01) |
| *B60G 21/00* | (2006.01) |

(52) U.S. Cl.
CPC ............ *B60G 17/06* (2013.01); *B60G 17/08* (2013.01); *B60G 21/00* (2013.01); *B60G 2202/322* (2013.01); *B60G 2204/4232* (2013.01); *B60G 2400/10* (2013.01); *B60G 2400/102* (2013.01); *B60G 2400/206* (2013.01); *B60G 2400/25* (2013.01); *B60G 2500/10* (2013.01)

(58) Field of Classification Search
USPC .......................................... 701/37; 188/266.2
See application file for complete search history.

(56) References Cited

U.S. PATENT DOCUMENTS

| | | | |
|---|---|---|---|
| 8,560,171 | B2 | 10/2013 | Hozumi |
| 2011/0127127 | A1* | 6/2011 | Hirao ..................... B60G 17/08 188/266.2 |
| 2012/0010780 | A1* | 1/2012 | Hayashi ............... B60G 17/018 701/37 |

FOREIGN PATENT DOCUMENTS

| | | |
|---|---|---|
| JP | 9-240240 | 9/1997 |
| JP | 2006-44523 | 2/2006 |
| JP | 2011-131876 | 7/2011 |
| WO | 2010/073412 | 7/2010 |

\* cited by examiner ized.
SUSPENSION CONTROL APPARATUS FOR DAMPING OSCILLATION OF A VEHICLE This application is a divisional application of application Ser. No. 14/037,914, filed Sep. 26, 2013.

BACKGROUND OF THE INVENTION

The present invention relates to a suspension control apparatus mounted on a vehicle such as a four-wheeled automobile, and preferably used to damp an oscillation of the vehicle.

Generally, a vehicle such as an automobile includes a damping force adjustable shock absorber mounted between a vehicle body and each axle, and a suspension control apparatus configured to adjust a damping force characteristic of the shock absorber (for example, refer to Japanese Patent Public Disclosure No. 2011-131876). This kind of suspension control apparatus according to a conventional technique detects a vertical oscillation of a vehicle as a sprung speed or a sprung acceleration, and controls the shock absorber so as to generate a damping force according to the detected speed and the like.

The suspension control apparatus according to the conventional technique outputs a control signal based on, for example, Skyhook control to the shock absorber to control a damping force to be generated. In this case, there is such a problem that, because a damping force of a vehicle is determined based on a control instruction, and the instruction may be requested even for a region in which the shock absorber cannot control, the control instruction suddenly changes when a stroke of the shock absorber reverses between an extension stroke and a compression stroke, leading to occurrence of a jerk.

SUMMARY OF INVENTION

The present invention has been contrives in consideration of the problem with the above-described conventional technique, and an object of the present invention is to provide a suspension control apparatus capable of preventing a sudden change in a damping force when a stroke of a shock absorber reverses.

According to one aspect of the present invention, a suspension control apparatus includes a damping force adjustable shock absorber disposed between a vehicle body and a wheel of a vehicle and capable of adjusting a damping force to be generated, a vertical movement detection device configured to detect a state regarding a vertical movement of a vehicle, and a controller configured to output a control signal for controlling the damping force to be generated by the damping force adjustable shock absorber based on a detection result of the vertical movement detection device. The controller includes a target damping force calculation section configured to calculate a target damping force based on a detection result of the vertical movement detection device, a correction section configured to calculate a corrected damping force, which is acquired by reducing the target damping force, when a relative speed is a low speed between a sprung side and an unsprung side of the damping force adjustable shock absorber, and a control signal output section configured to output the control signal corresponding to the corrected damping force to the damping force adjustable shock absorber.

According to another aspect of the present invention, a suspension control apparatus includes a damping force adjustable shock absorber disposed between a vehicle body and a wheel of a vehicle and capable of adjusting a damping force to be generated, a vertical movement detection device configured to detect a state regarding a vertical movement of the vehicle, and a controller configured to output a control signal for controlling a damping force to be generated by the damping force adjustable shock absorber based on a detection result of the vertical movement detection device. The controller includes a target damping coefficient calculation section configured to calculate a target damping coefficient based on a detection result of the vertical movement detection device, a correction section configured to calculate a corrected damping coefficient, which is acquired by reducing an upper limit of the target damping coefficient, when a relative speed is a low speed between a sprung side and an unsprung side of the damping force adjustable shock absorber, and a control signal output section configured to output the control signal corresponding to the corrected damping coefficient to the damping force adjustable shock absorber.

DESCRIPTION OF EMBODIMENTS

Hereinafter, a suspension apparatus according to embodiments of the present invention will be described in detail with reference to the accompanying drawings based on an example in which the suspension apparatus is employed for, for example, a four-wheeled automobile.

First, FIGS. 1 to 8 illustrate a suspension control apparatus according to a first embodiment. A vehicle body 1 constitutes a body of a vehicle. For example, left and right front wheels and left and right rear wheels (hereinafter collectively referred to as a wheel 2) are disposed under the vehicle body 1, and the wheel 2 includes a tire 3. The tire functions as a spring that absorbers minute undulation on a road surface.

Figure 1:
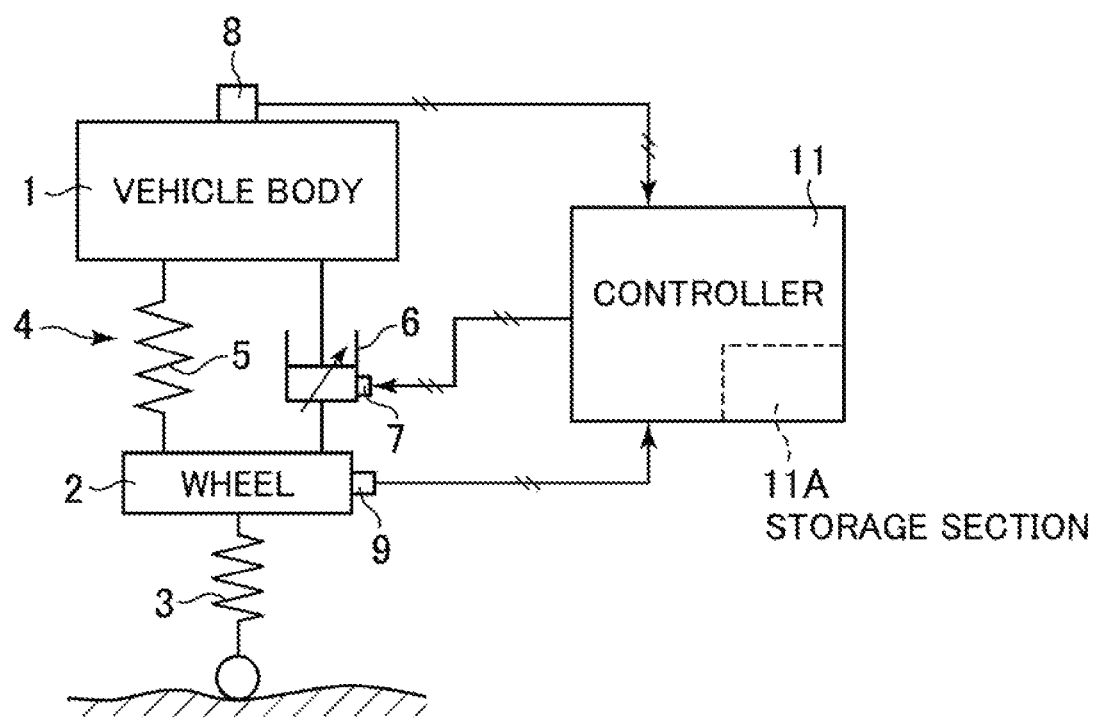
FIG. 1 schematically illustrates a suspension control apparatus according to a first embodiment.

The suspension apparatus 4 is disposed between the vehicle body 1 and the wheel 2. The suspension apparatus 4 is constituted by a suspension spring 5 (hereinafter referred to as a spring 5), and a damping force adjustable shock absorber (hereinafter referred to as a shock absorber 6) disposed between the vehicle body 1 and the wheel 2 in parallel with the spring 5. FIG. 1 illustrates an example in which a single set of the suspension apparatus 4 is disposed between the vehicle body 1 and the wheel 2. However, for example, four suspension apparatuses 4 in total are individually independently disposed between four wheels 2 and the vehicle body 1, and FIG. 1 schematically illustrates only one set of them. In the present embodiment, a suspension control apparatus comprises the shock absorber 6 with an actuator 7 attached thereto, and a controller 11 which will be described below.

The shock absorber 6 of the suspension apparatus 4 is constituted by using a hydraulic shock absorber capable of adjusting a damping force. The actuator 7 formed from a damping force adjustment valve and the like is attached to the shock absorber 6 to continuously adjust the characteristic of the damping force to be generated (damping force characteristic) from a hard characteristic to a soft characteristic. The damping force adjustment valve may be able to adjust the damping force characteristic through two steps or a plurality of steps, instead of continuously adjusting the damping force characteristic. Further, the shock absorber 6 may be a pressure control type or a flow amount control type.

A sprung acceleration sensor 8 is disposed on the vehicle body 1. More specifically, the sprung acceleration sensor 8 is mounted on the vehicle body 1, for example, at a position around the shock absorber 6. Then, the sprung acceleration sensor 8 detects a vertical oscillation acceleration at the vehicle body side, which is a so-called sprung side, and outputs the detected signal to the controller 11, which will be described below.

An unsprung acceleration sensor 9 is disposed at the wheel side of the vehicle. This unsprung acceleration sensor 9 detects a vertical oscillation acceleration on the wheel side, which is a so-called unsprung side, and outputs the detected signal to the controller 11, which will be described below. At this time, the sprung acceleration sensor 8 and the unsprung acceleration sensor 9 constitute a vertical movement detection device that detects a state regarding a vertical movement of the vehicle. The vertical movement detection device may be constituted by not only the sprung acceleration sensor 8 and the unsprung acceleration sensor 9 disposed around the shock absorber 6, but also by, for example, the sprung acceleration sensor 8 alone. Alternatively, the vertical movement detection device may be constituted by a vehicle height sensor. Further alternatively, the vertical movement detection device may be realized by providing a single sprung acceleration sensor 8 on the vehicle body, and detecting a vertical movement by estimating a vertical movement of each wheel based on information from the single sprung acceleration sensor and other sensor such as a wheel speed sensor.

The controller 11 is realized by, for example, a microcomputer. The controller 11 constitutes a control device that controls a damping force to be generated by the shock absorber 6 based on detection results of the acceleration sensors 8 and 9, and the like. The input side of this controller 11 is connected to the acceleration sensors 8 and 9, and the like. The output side of the controller 11 is connected to the actuator 7 of the shock absorber 6, and the like. Further, the controller 11 includes a storage section 11A, which is a ROM, a RAM, or the like.

Figure 4:
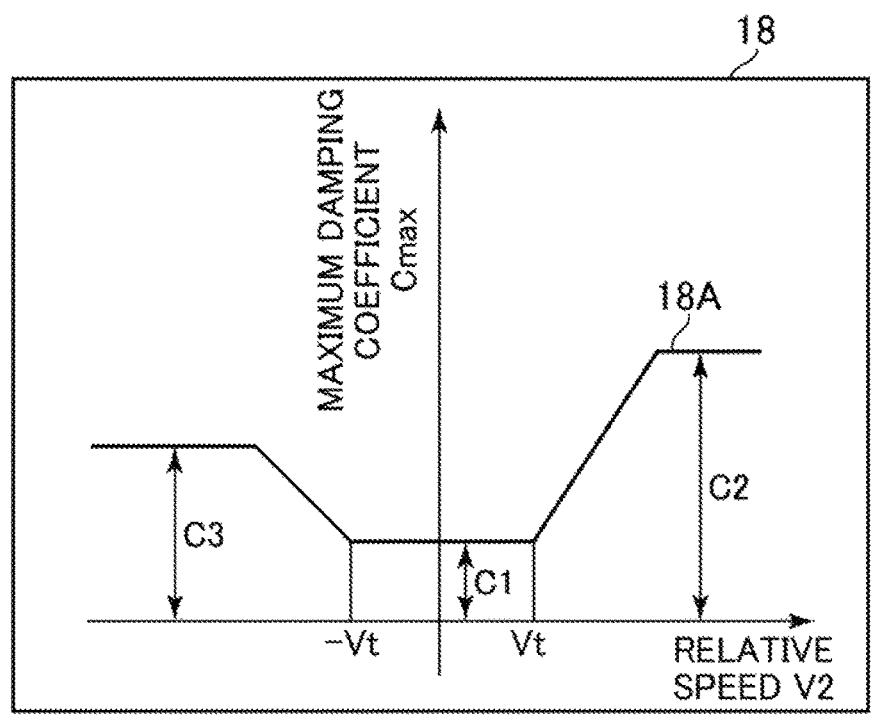
FIG. 4 illustrates a maximum damping coefficient map illustrated in FIG. 2.
Figure 5:
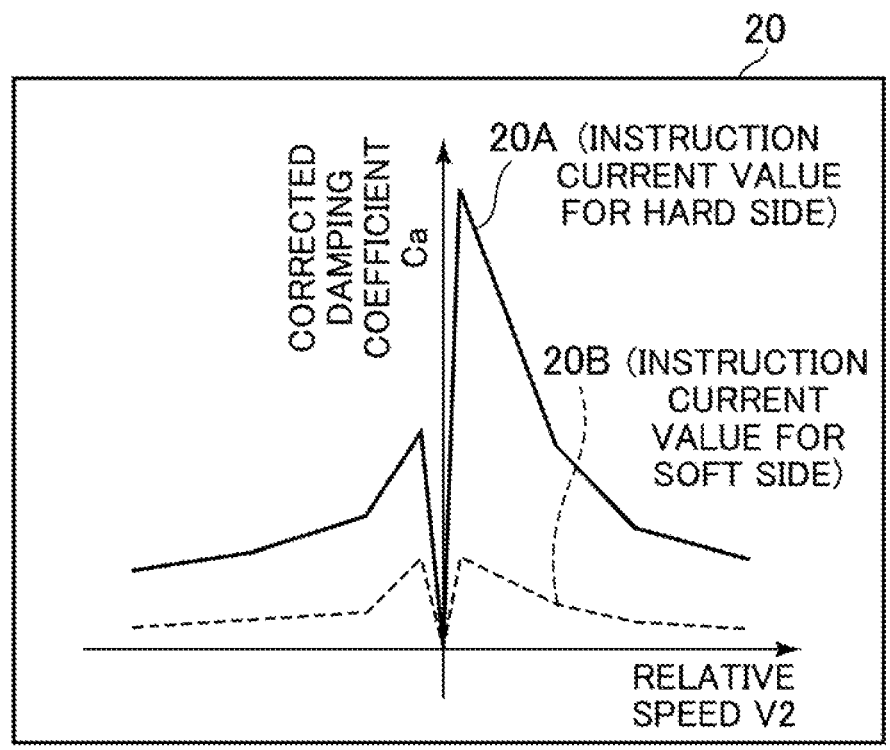
FIG. 5 illustrates a damping coefficient map illustrated in FIG. 2.

Then, a maximum damping coefficient map 18, which outputs a maximum damping coefficient $C_{max}$ based on a relative speed V2 illustrated in FIG. 4, and a damping coefficient map 20, which indicates a relationship among a corrected damping coefficient $C_a$, the relative speed V2, and an instruction current value I illustrated in FIG. 5, are stored in the storage section 11A of the controller 11.

Figure 2:
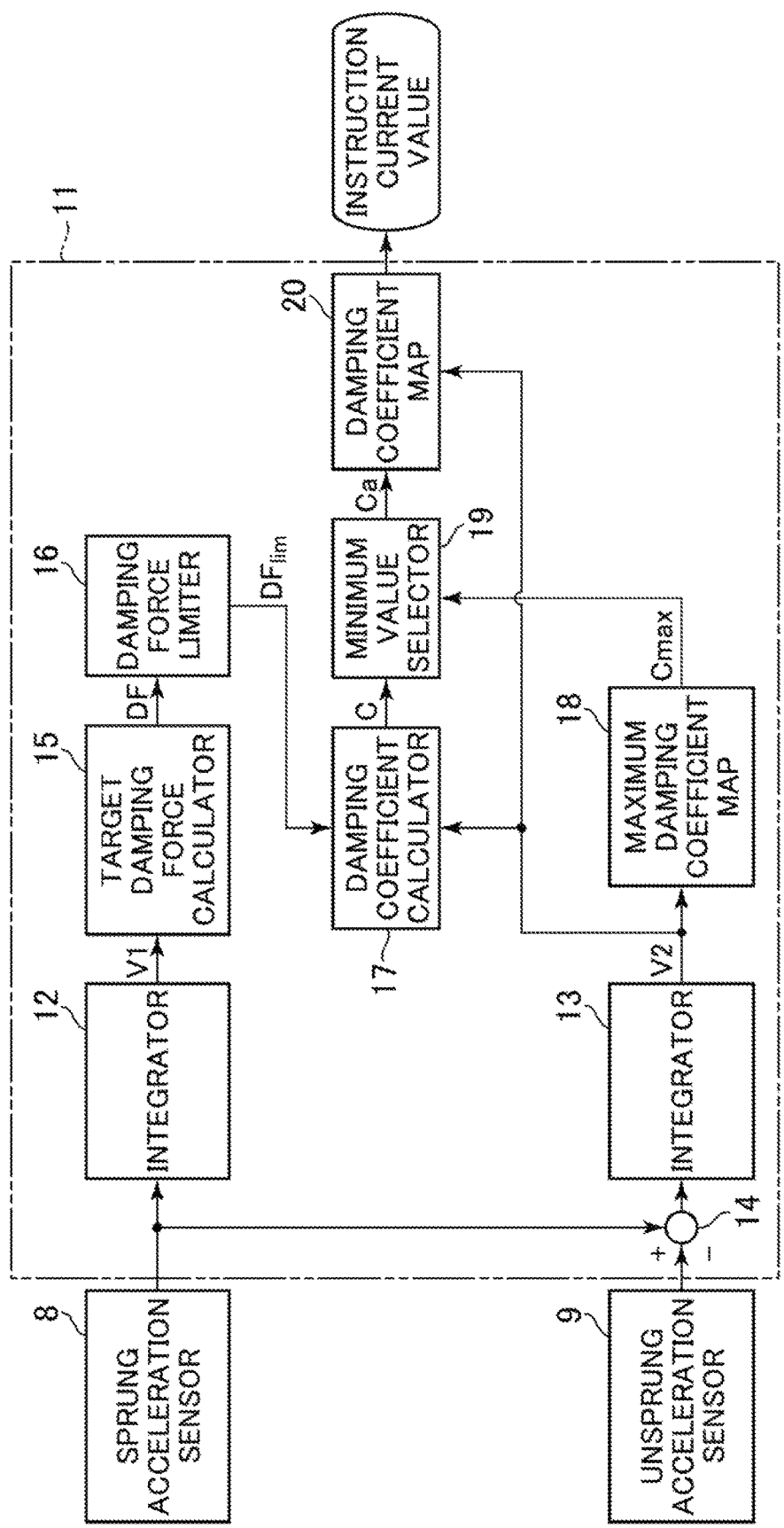
FIG. 2 is a block diagram illustrating a controller illustrated in FIG. 1.

As illustrated in FIG. 2, the controller 11 includes integrators 12 and 13, a subtractor 14, a target damping force calculator 15, a damping force limiter 16, a damping coefficient calculator 17, the maximum damping coefficient map 18, a minimum value selector 19, and the damping coefficient map 20.

The integrator 12 of the controller 11 calculates a sprung speed V1, which is a speed in the vertical direction of the vehicle body 1, by integrating a detection signal from the sprung acceleration sensor 8. Therefore, a vehicle body side vertical speed detection device is constituted by the sprung acceleration sensor 8 and the integrator 12, and the integrator 12 outputs the sprung speed V1, which is a vertical speed of the vehicle body side.

On the other hand, the subtractor 14 subtracts a detection signal from the unsprung acceleration sensor 9 from a detection signal from the sprung acceleration sensor 8 to calculate a difference between a sprung acceleration and an unsprung acceleration. At this time, this difference value corresponds to a relative acceleration between the vehicle body 1 and the wheel 2. Then, the integrator 13 integrates a relative acceleration output from the subtractor 14, and calculates a vertical relative speed V2 between the vehicle body 1 and the wheel 2 as a relative speed between the sprung side and the unsprung side of the shock absorber 6. Therefore, a relative speed detection device is constituted by the sprung acceleration sensor 8, the unsprung acceleration sensor 9, the subtractor 14, and the integrator 13. The integrator 13 outputs the relative speed V2.

The target damping force calculator 15 outputs a target damping force DF to be generated by the shock absorber 6 based on the sprung speed V1. This target damping force DF is calculated based on, for example, the Skyhook control theory. More specifically, the target damping force calculator 15 calculates the target damping force DF by multiplying the sprung speed V1 by a Skyhook damping coefficient $C_{sky}$, which is calculated from the Skyhook control theory, as indicated by the following expression, an expression 1.

$$DF = Csky * V1 \quad \text{(EXPRESSION 1)}$$

Figure 3:
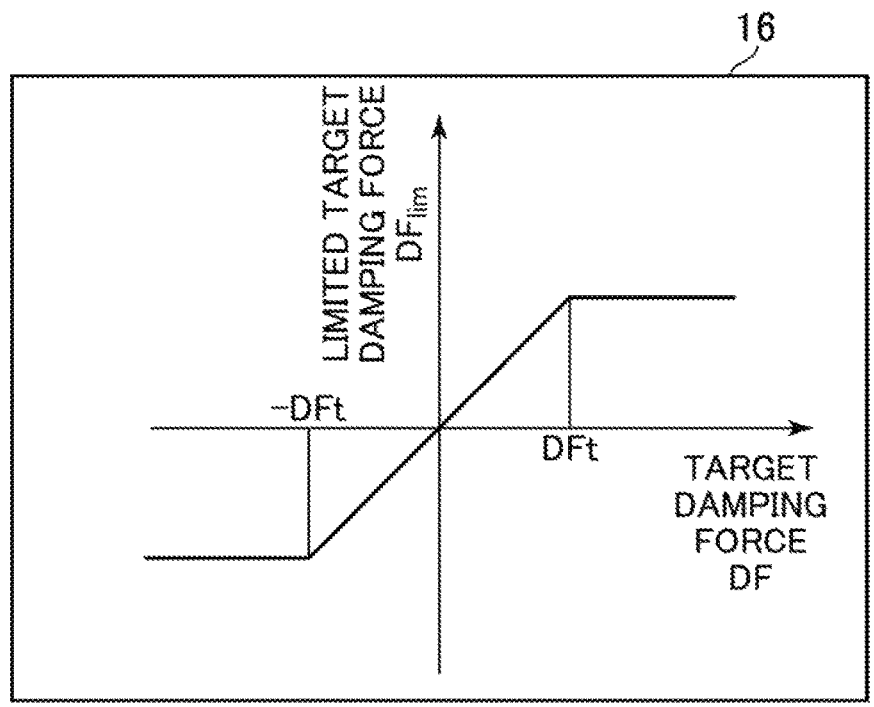
FIG. 3 illustrates a damping force limiter illustrated in FIG. 2.

The damping force limiter 16 limits a positive value and a negative value of a maximum value of the target damping force DF, respectively independently. As illustrated in FIG. 3, with the sprung speed V1 at the positive side, if the target damping force DF is smaller than a predetermined positive-side threshold value DFt (DF<DFt), the damping force limiter 16 outputs a value of the target damping force DF as a limited target damping force $DF_{lim}$. If the target damping force DF is larger than the threshold value DFt (DF≥DFt), the damping force limiter 16 outputs a values of the threshold value DFt as the limited target damping force $DF_{lim}$.

Similarly, with the sprung speed V1 at the negative side, if the target damping force DF is larger than a predetermined negative-side threshold value (−DFt) (DF>−DFt), the damping force limiter 16 outputs a values of the target damping force DF as the limited target damping force $DF_{lim}$. If the target damping force DF is smaller than the threshold value (−DFt) (DFS≤−DFt), the damping force limiter 16 outputs a value of the threshold value (−DFt) as the limited target damping force $DF_{lim}$.

In other words, if the absolute value of the target damping force DF is smaller than the absolute value of the threshold value DFt (|DF|<|DFt|), the damping force limiter 16 outputs a value of the target damping force DF as the limited target damping force $DF_{lim}$. If the absolute value of the target damping force DF exceeds the threshold value DFt (|DF|≥|DFt|), the damping force limiter 16 outputs a value of the threshold value (±DFt) as the limited target damping force $DF_{lim}$. At this time, the threshold value DFt is set to a smaller value than a damping force that the shock absorber 6 can generate. Therefore, the damping force limiter 16 sets the limited target damping force $DF_{lim}$ so as to be smaller than the damping force that the shock absorber 6 can generate.

The threshold value DFt may be set to a same value between the positive side and the negative side of the relative speed V2, or may be set to different values from each other between the positive side and the negative side of the relative speed V2 in consideration of the damping force characteristic and the like of the shock absorber 6.

The damping coefficient calculator 17 calculates a target damping coefficient C based on the limited target damping force $DF_{lim}$ and the relative speed V2. More specifically, the damping coefficient calculator 17 calculates the target damping coefficient C by dividing the limited target damping force $DF_{lim}$ by the relative speed V2, as indicated by the following expression, an expression 2.

$$C = DF_{lim}/V2 \quad \text{(EXPRESSION 2)}$$

In this case, the target damping force calculator 15, the damping force limiter 16, and the damping coefficient calculator 17 constitute a target damping coefficient calculation section that calculates the target damping coefficient C based on detection results of the acceleration sensors 8 and 9.

The maximum damping coefficient map 18 includes a characteristic line 18A that indicates a relationship between the relative speed V2 and a maximum damping coefficient $C_{max}$, and outputs the maximum damping coefficient $C_{max}$ based on the relative speed V2. At this time, the maximum damping coefficient $C_{max}$ is set to a value within a range that not exceeds a maximum value of a damping coefficient that the shock absorber 6 can generate. As illustrated in FIG. 4, the maximum damping coefficient $C_{max}$ is set to a smaller value if the relative speed V2 is lower than a predetermined threshold value Vt, and is set to a larger value if the relative speed V2 is higher than the threshold value Vt.

More specifically, if the relative speed V2 is lower than the threshold value Vt (−Vt<V2<Vt), the maximum damping coefficient $C_{max}$ is set to a low speed set value C1, which is a smaller value. On the other hand, if the relative speed V2 at the extension side (the positive side) is higher than the threshold value Vt (V2>Vt), the maximum damping coefficient $C_{max}$ is set to a high speed set value C2, which is a larger value than the low speed set value C1. Similarly, if the relative speed V2 at the compression side (the negative side) is higher than the threshold value Vt (V2<−Vt), the maximum damping coefficient $C_{max}$ is set to a high speed set value C3, which is a larger value than the low speed set value C1.

When the relative speed V2 has a value close to the threshold value Vt, the maximum damping coefficient $C_{max}$ may be set to a value between the low speed set value C1 and the high speed set value C2, like a linear region in a region corresponding to the relative speed V2>Vt illustrated in FIG. 4. Similarly, when the relative speed V2 has a value close to the threshold value (−Vt), the maximum damping coefficient $C_{max}$ may be set to a value between the low speed set value C1 and the high speed set value C3, like a linear region in a region corresponding to the relative speed V2<−Vt illustrated in FIG. 4. Further, one or both of the linear regions in the regions corresponding to the relative speed V2>Vt and the relative speed V2<−Vt may be omitted, and the maximum damping coefficient $C_{max}$ may change in a stepwise manner between the low speed set value C1 and the high speed set value C2 when V2=Vt, and/or may change in a stepwise manner between the low speed set value C1 and the high speed set value C3 when V2=−Vt.

FIG. 4 illustrates an example in which the high speed set value C2 at the extension side (the positive side) of the relative speed V2 is larger than the high speed set value C3 at the compression side (the negative side) of the relative speed V2. The set values are set in this manner in consideration of a difference in the characteristic of the damping force generated by the shock absorber 6 between the extension side and the compression side. In this manner, the high speed set values C2 and C3 are appropriately set in consideration of the structure, the specification, and the damping force characteristic, and the like of the shock absorber 6. Further, the present embodiment is described based on the example in which all of the low speed set value C1 and the high speed set values C2 and C3 are constant values, but the present embodiment may be configured in such a manner that these set values change according to the relative speed V2.

The threshold value Vt is acquired from an experiment in consideration of, for example, an occurrence situation of a jerk, and is appropriately set according to the structure, the damping force characteristic, and the like of the shock absorber 6. Further, the threshold value Vt may be set to a same value between the positive side and the negative side of the relative speed V2, or may be set to different values from each other between the positive side and the negative side of the relative speed V2.

The minimum value selector 19 compares the target damping coefficient C output from the damping coefficient calculator 7 and the maximum damping coefficient $C_{max}$ output from the maximum damping coefficient map 18, and selects a smaller one of these coefficients C and $C_{max}$ to output it as a corrected damping coefficient Ca. Therefore, the minimum value selector 19 and the maximum damping coefficient map 18 constitute a correction section that calculates the corrected damping coefficient Ca, which is acquired by reducing an upper limit of the target damping coefficient C, when the relative speed V2 is a low speed.

The damping coefficient map 20 constitutes a control signal output section, and outputs an instruction current value I as a control signal corresponding to the corrected damping coefficient Ca. As illustrated in FIG. 5, the damping coefficient map 20 variably sets a relationship between the corrected damping coefficient Ca and the instruction current value I according to the relative speed V2, and is generated based on experiment data by the inventors of the present invention. Then, the damping coefficient map 20 identifies the instruction current value I for adjusting the damping force characteristic of the shock absorber 6 based on the corrected damping coefficient Ca from the minimum value selector 19 and the relative speed V2 from the integrator 13, and outputs this instruction current value I to the actuator 7 of the shock absorber 6.

Further, the damping coefficient map 20 outputs a control signal (the instruction current value I) for controlling the shock absorber 6 in such a manner that the damping force adjustable shock absorber operates in conformity to the Skyhook theory. This damping coefficient map 20 has a hard-side characteristic line 20A indicated by a solid line in FIG. 5, and a soft-side characteristic line 20B indicated by a broken line in FIG. 5. At this time, the hard-side characteristic line 20A is positioned in a range where the corrected damping coefficient Ca is larger than the soft-side characteristic line 20B.

Then, upon an input of the relative speed V2 and the corrected damping coefficient Ca, the damping coefficient map 20 acquires an intersection point between the corrected damping coefficient Ca and the relative speed V2 in the damping coefficient map 20. If this intersection point is positioned in a range where the corrected damping coefficient Ca is larger than the hard-side characteristic line 20A, the instruction current value I is increased to set the damping force characteristic to the hard characteristic. On the other hand, if the intersection point is positioned within a range where the corrected damping coefficient Ca is smaller than the soft-side characteristic line 20B, the instruction current value I is reduced to set the damping force characteristic to the soft characteristic. Further, if the intersection point is positioned in a range between the haft-side characteristic line 20A and the soft-side characteristic line 20B, the instruction current value I is adjusted according to the corrected damping coefficient Ca to set the damping force characteristic to an intermediate characteristic between the hard characteristic and the soft characteristic.

In this manner, the damping force generated by the shock absorber 6 is variably adjusted continuously or through a plurality of steps between the hard characteristic and the soft characteristic according to the instruction current value I supplied to the actuator 7.

The vehicle suspension control apparatus according to the first embodiment is configured in the above-described manner. Next, a description will be provided of processing for variably controlling the damping force characteristic of the shock absorber 6 using the controller 11.

When the vehicle runs, a detection signal of a vertical oscillation acceleration of the sprung (the vehicle body 1) side is input from the sprung acceleration sensor 8 into the controller 11, and a detection signal of a vertical oscillation acceleration at the unsprung (the wheel 2) side is input from the unsprung acceleration sensor 9 into the controller 11.

At this time, the controller 11 performs ride comfort control processing based on the acquired information, and calculates the target damping coefficient C and the relative speed V2. More specifically, the integrator 12 of the controller 11 integrates the detection signal of the oscillation acceleration by the sprung acceleration sensor 8 to calculate the sprung speed V1. Then, the target damping force calculator 15, the damping force limiter 16, and the damping coefficient calculator 17 calculate the target damping coefficient C based on the sprung speed V1.

Further, the subtractor 14 of the controller 11 subtracts the detection signal from the unsprung acceleration sensor 9 from the detection signal from the sprung acceleration sensor 8. Then, the integrator 13 integrates the relative acceleration output from the subtractor 14 to calculate the vertical relative speed V2 between the vehicle body 1 and the wheel 2.

Further, the maximum damping coefficient map 18 of the controller 11 outputs a maximum damping coefficient $C_{max}$ corresponding to the relative speed V2. Then, the minimum value selector 19 of the controller 11 selects a smaller one of the target damping coefficient C and the maximum damping coefficient $C_{max}$ to output it as the corrected damping coefficient Ca. The damping coefficient map 20 calculates the instruction current value I corresponding to the corrected damping coefficient Ca and the relative speed V2.

Then, the instruction current value I is input into the actuator 7 of the shock absorber 6, whereby driving of the actuator 7 is controlled. As a result, the damping force characteristic of the shock absorber 6 is continuously variably controlled between the hard characteristic and the soft characteristic.

Figure 6:
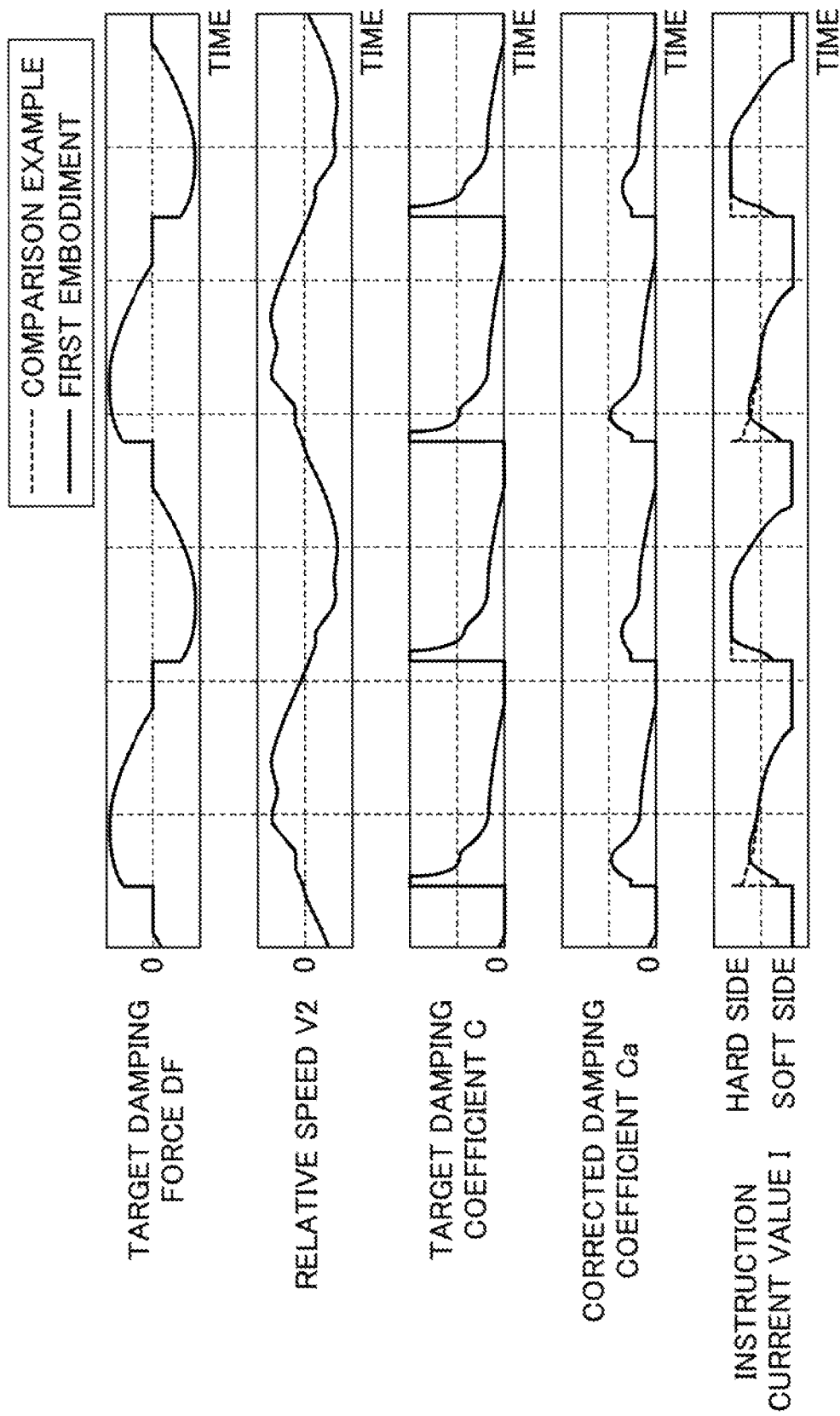
FIG. 6 illustrates characteristic lines indicating temporal changes of a target damping force, a relative speed, a target damping coefficient, a corrected damping coefficient, and an instruction current value in the first embodiment and a comparison example.

FIG. 6 illustrates a time chart when the suspension control apparatus according to the first embodiment is used. The first embodiment calculates the target damping coefficient C based on the target damping force DF and the relative speed V2, and corrects this target damping coefficient C according to the relative speed V2 to calculate the corrected damping coefficient Ca. The upper limit of the target damping coefficient C is reduced by the corrected damping coefficient Ca in a region where the relative speed V2 is a low speed. The instruction current value I is calculated according to this corrected damping coefficient Ca.

As a result, according to the first embodiment, the instruction current value I rises smoothly, compared to a comparison example that controls the shock absorber 6 based on the target damping force DF without making a correction based on the relative speed V2. Therefore, it is possible to prevent a sudden change in the damping force to thereby reduce a jerk.

Figure 7:
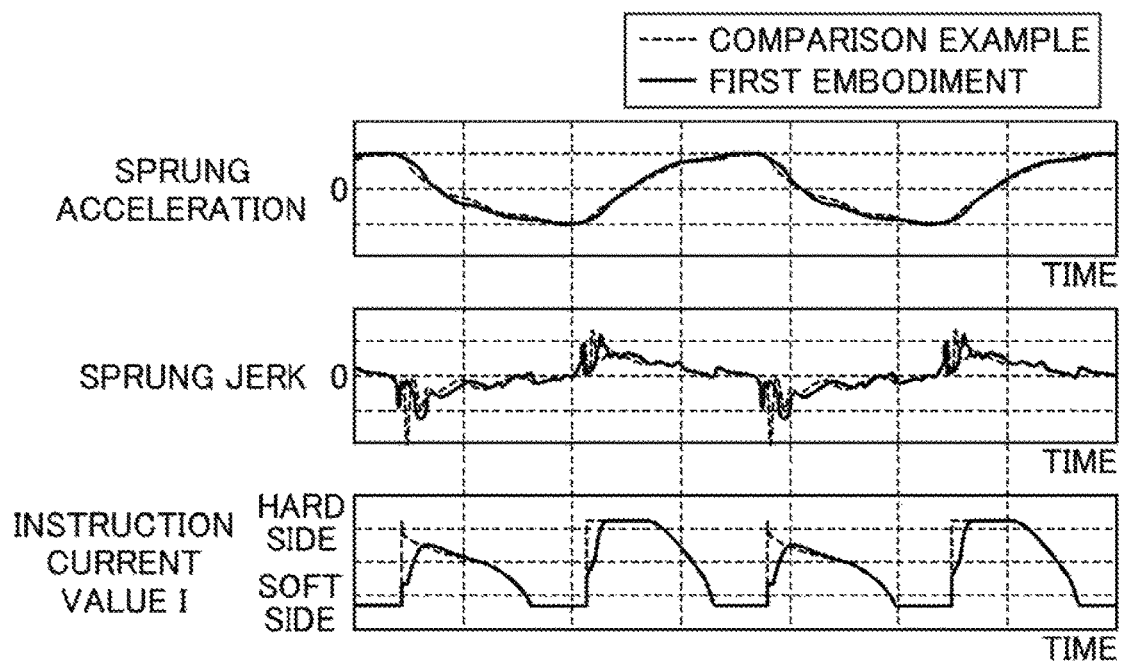
FIG. 7 illustrates characteristic lines indicating temporal changes of a sprung acceleration, a sprung jerk, and an instruction current value in the first embodiment and the comparison example.
Figure 8:
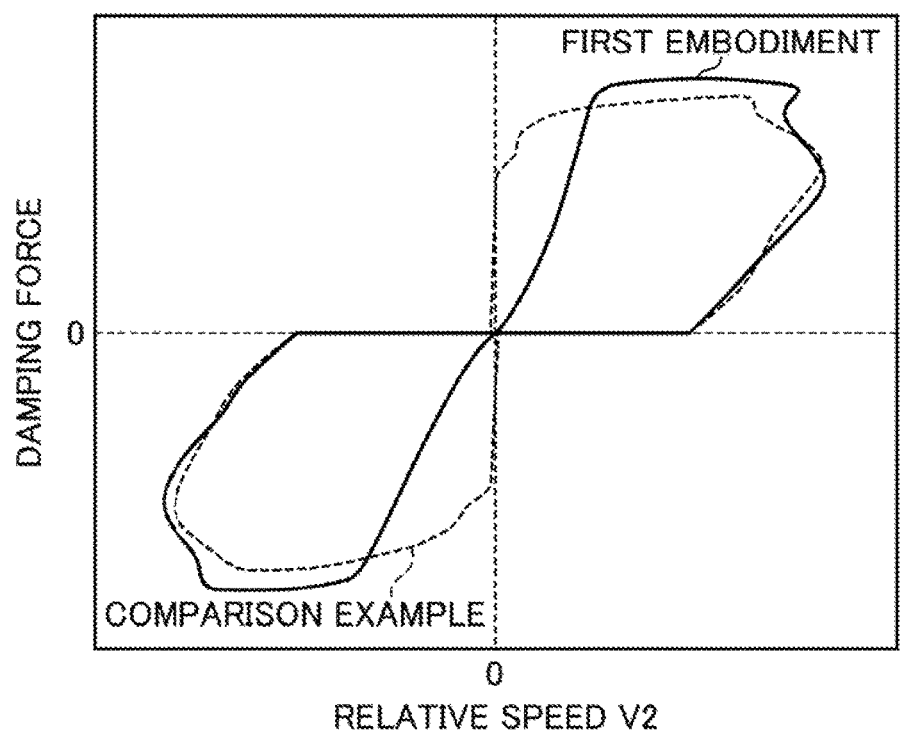
FIG. 8 illustrates characteristic lines indicating a relationship between a relative speed and a damping force in the first embodiment and the comparison example.

Further, a simulation was conducted, in which a vehicle ran on a continuously tortuous road to compare a jerk reduction effect and the like between the first embodiment and the above-described comparison example. FIGS. 7 and 8 illustrate the result thereof.

As illustrated in FIG. 7, the first embodiment had a sprung acceleration similar to the comparison example, and maintained the damping effect. In addition, the first embodiment controlled the instruction current value I to smoothly change, thereby preventing a sudden change in the damping force. In this manner, the simulation revealed that the first embodiment could reduce a jerk, which was a problem with the comparison example.

Further, FIG. 8 illustrates a relationship between the instructed damping force and the relative speed V2. A solid line in FIG. 8 corresponds to the first embodiment, and represents a relationship between the damping force (the instruction value) and the relative speed V2 based on the corrected damping coefficient Ca. On the other hand, a broken line in FIG. 8 corresponds to the comparison example, and represents a relationship between the target damping force DF and the relative speed V2.

Under the Skyhook control according to the conventional technique, a value in a second quadrant and a fourth quadrant in FIG. 8, which the shock absorber cannot generate, is also output as a calculation result. However, normally, a value in the second quadrant and the fourth quadrant is controlled as zero, and the conventional technique has the characteristic indicated by the broken line in FIG. 8. The actually generated damping force reduces as the relative speed V2 approaches zero, but a large instruction value is issued even when the relative speed V2 approaches zero as long as an absolute vertical speed of the vehicle body is high.

The first embodiment limits the upper limit of the target damping coefficient C to a smaller value when the relative speed V2 is a low speed. At this time, the target damping coefficient C corresponds to an inclination of an increase in the damping force relative to an increase in the relative speed V2, whereby it can be understood that the first embodiment reduces a change in the damping force when the stroke reverses to realize a smooth increase compared to the comparison example by limiting the upper limit of the target damping coefficient C.

In this manner, according to the first embodiment, the controller 11 is configured to calculate a target damping coefficient C based on detection signals from the acceleration sensors 8 and 9, calculate a corrected damping coefficient Ca, which is acquired by reducing the upper limit of the target damping coefficient C, when the relative speed V2 is a low speed, and output an instruction current value I corresponding to the corrected damping coefficient Ca to the shock absorber 6. Therefore, when the relative speed V2 is a low speed, like the relative speed V2 when the stroke reverses between an extension stroke and a compression stroke of the shock absorber 6, the controller 11 outputs the corrected damping coefficient Ca, which is acquired by reducing the upper limit of the target damping coefficient C, and outputs an instruction current value I corresponding to this corrected damping coefficient Ca to the shock absorber 6. As a result, it is possible to reduce occurrence of a strange noise and a jerk due to a sudden change in the damping force.

On the other hand, when the relative speed V2 is a high speed, the controller 11 calculates the corrected damping coefficient Ca, which is acquired by increasing the upper limit of the target damping coefficient, compared to the upper limit of the target damping coefficient when the relative speed V2 is low. In this case, when the relative speed V2 is a high speed, like the relative speed V2 when the shock absorber 6 is in the middle of an extension stoke or a compression stroke, it is possible to calculate a larger value as the corrected damping coefficient Ca without limiting the target damping coefficient C as much as possible. As a result, when the relative speed V2 is a high speed, it is possible to generate a larger damping force by the shock absorber 6 to secure a sufficient damping performance, thereby improving ride comfort.

Further, the controller 11 includes the maximum damping coefficient map 18 having the maximum damping coefficient $C_{max}$ according to the relative speed V2, and the minimum value selector 19 that corrects the target damping coefficient C to the maximum damping coefficient $C_{max}$ when the target damping coefficient C exceeds the maximum damping coefficient $C_{max}$. Therefore, it is possible to set the corrected damping coefficient Ca to be smaller than the maximum damping coefficient $C_{max}$ by comparing the target damping coefficient C and the maximum damping coefficient $C_{max}$. As a result, it is possible to limit the target damping coefficient C corresponding to an inclination of the target damping force DF relative to the relative speed V2 to prevent a sudden change in the damping force.

Figure 9:
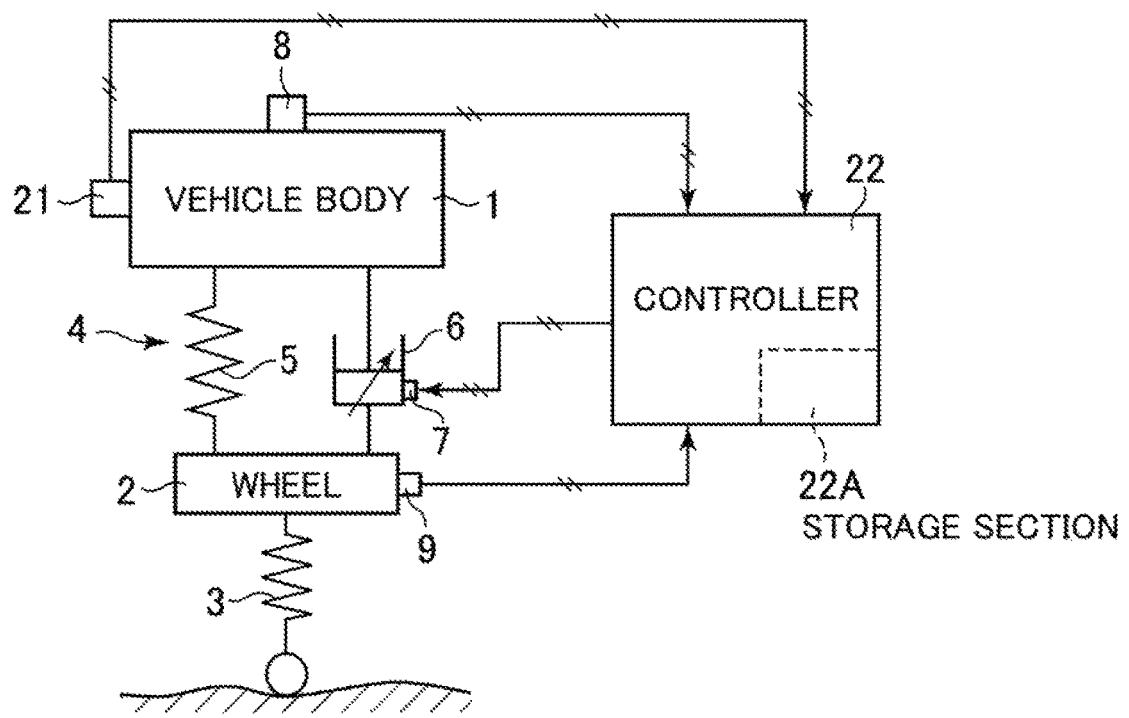
FIG. 9 schematically illustrates a suspension control apparatus according to a second embodiment.
Figure 10:
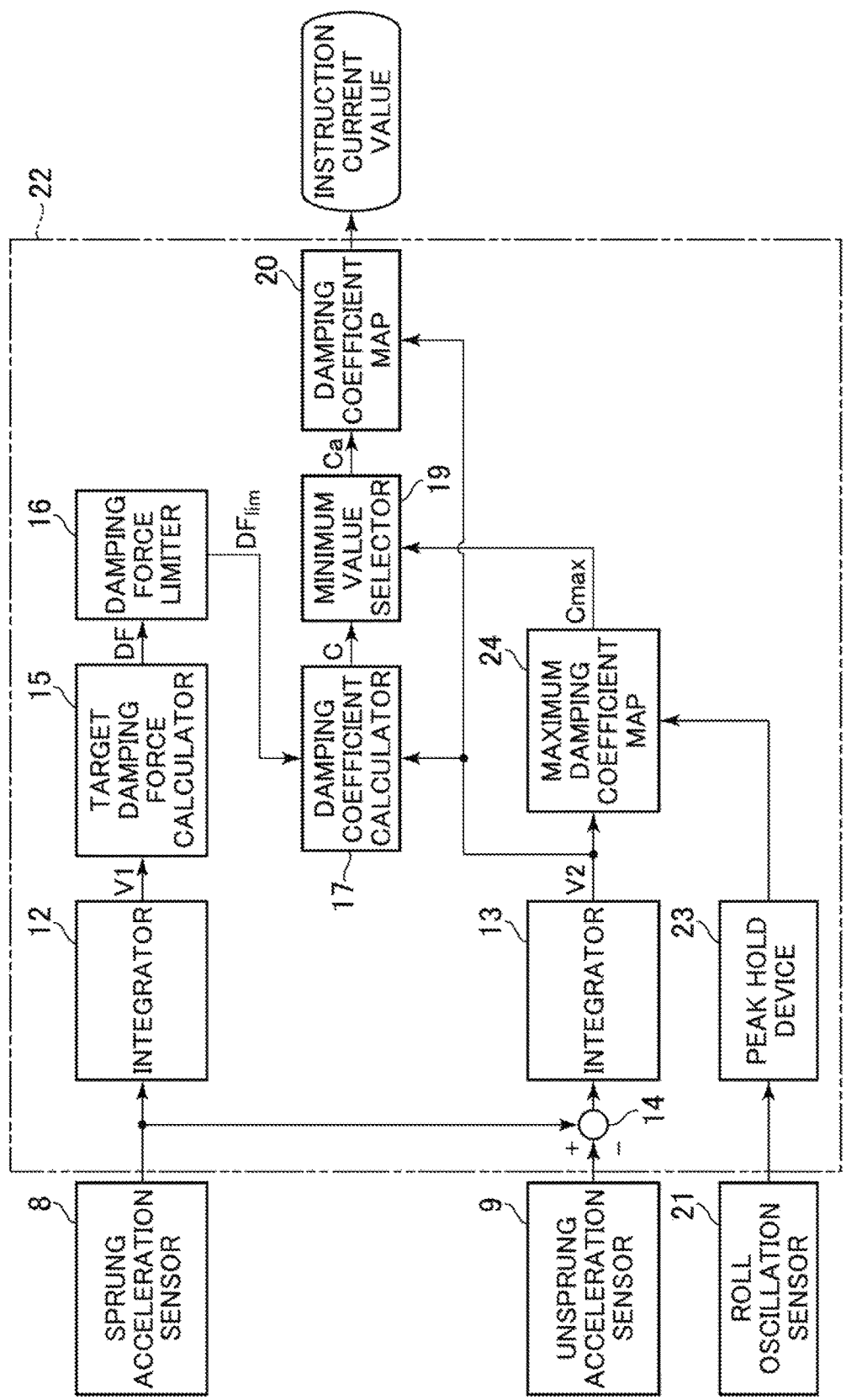
FIG. 10 is a block diagram illustrating a controller illustrated in FIG. 9.
Figure 11:
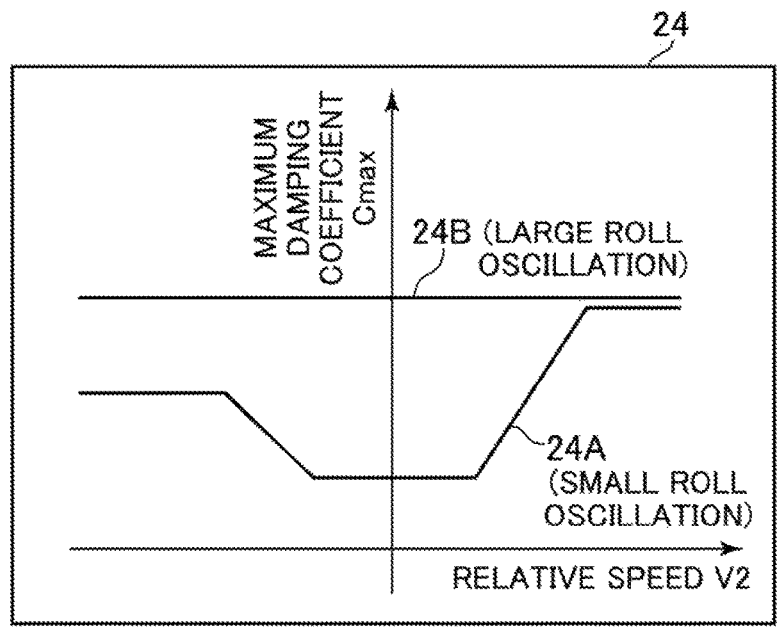
FIG. 11 illustrates a maximum damping coefficient map in FIG. 10.

Next, FIGS. 9 to 11 illustrate a second embodiment of the present invention. The second embodiment is characterized by being configured in such a manner that a correction amount of the target damping coefficient is reduced when a roll oscillation exceeds a predetermined level. In the following description of the second embodiment, similar components to the first embodiment will be identified by the same reference numerals, and descriptions thereof will be omitted below.

A roll oscillation sensor 21 is mounted on the vehicle body 1, and constitutes an orientation change detection section (attitude change detection section) that detects a change in the orientation (attitude) of the vehicle body 1. This roll oscillation sensor 21 detects, for example, a roll rate, a roll acceleration, a roll angle, and a difference between outputs from left and light vertical acceleration sensors as a roll oscillation generated at the vehicle body 1, and outputs this detection signal to a controller 22, which will be described below.

The controller 22 is configured in a substantially similar manner to the first embodiment, and constitutes a control device that controls the shock absorber 6 based on detection signals from the acceleration sensors 8 and 9, and the like. The input side of this controller 22 is connected to the acceleration sensors 8 and 9, the roll oscillation sensor 21, and the like. The output side of the controller 22 is connected to the actuator 7 of the shock absorber 6 and the like. Further, the controller 22 includes a storage section 22A. A maximum damping coefficient map 24, which outputs the maximum damping coefficient $C_{max}$ based on the relative speed V2 illustrated in FIG. 11, and a damping coefficient map 20 illustrated in FIG. 5, are stored in the storage section 22A.

The controller 22 includes the integrators 12 and 13, the subtractor 14, the target damping force calculator 15, the damping force limiter 16, the damping coefficient calculator 17, a peak hold section 23, the maximum damping coefficient map 24, the minimum value selector 19, and the damping coefficient map 20.

The peak hold section 23 calculates a level of a roll oscillation by performing peak hold processing on a detection signal from the roll oscillation sensor 21.

As illustrated in FIG. 11, the maximum damping coefficient map 24 includes a characteristic line 24A substantially similar to the characteristic line 18A in the maximum damping coefficient map 18 according to the first embodiment. In addition, the maximum damping coefficient map 24 further includes a characteristic line 24B according to which a limit of the target damping coefficient C is smaller and the maximum damping coefficient $C_{max}$ is larger than the characteristic line 24A.

Then, when a level of a roll oscillation output from the peak hole section 23 is small (a roll oscillation is smaller than a threshold value), the maximum damping coefficient map 24 outputs the maximum damping coefficient $C_{max}$ based on the relative speed V2 with use of the characteristic line 24A similar to the characteristic line 18A in FIG. 4 of the first embodiment. At this time, the maximum damping coefficient $C_{max}$ is set to a smaller value when the relative speed V2 is lower than the predetermined threshold value Vt, and is set to a larger value when the relative speed V2 is higher than the threshold value Vt.

On the other hand, when a level of a roll oscillation output from the peak hold section 23 is large (when a roll oscillation is larger than the threshold value), the maximum damping coefficient map 24 outputs the maximum damping coefficient $C_{max}$ based on the relative speed V2 with use of the characteristic line 24B. At this time, the characteristic line 24B is, for example, set based on the maximum value of the damping force that the shock absorber 6 can generate, and a constant value is used as the maximum damping coefficient $C_{max}$ regardless of the relative speed V2.

The maximum damping coefficient map 24 switches the maximum damping coefficient $C_{max}$ between two levels according to a level of a roll oscillation, but may switch the maximum damping coefficient $C_{max}$ between three or more levels or continuously. Further, the threshold value used as a criterion for determining whether a level of a roll oscillation is large or small is obtained from an experiment in consideration of, for example, a duration time of a roll oscillation, a driver's driving feeling, and the like.

The minimum value selector 19 compares the target damping coefficient C output from the damping coefficient calculator 17 and the maximum damping coefficient $C_{max}$ output from the maximum damping coefficient map 24, and selects a smaller one of these coefficients C and $C_{max}$ to output it as the corrected damping coefficient Ca. Therefore, the minimum value selector 19 and the maximum damping coefficient map 24 constitute a correction section, and calculate the corrected damping coefficient Ca, which is acquired by reducing the upper limit of the target damping coefficient C when the relative speed V2 is a low speed, when a level of a roll oscillation is small. On the other hand, the minimum value selector 19 and the maximum damping coefficient map 24 calculate the corrected damping coefficient Ca, which is acquired by limiting the upper limit of the target damping coefficient C, within a range that does not exceed the constant maximum damping coefficient $C_{max}$ regardless of the relative speed V2, when a level of a roll oscillation is large. Then, the damping coefficient map 20 outputs the instruction current value I as a control signal corresponding to the corrected damping coefficient Ca.

Figure 12:
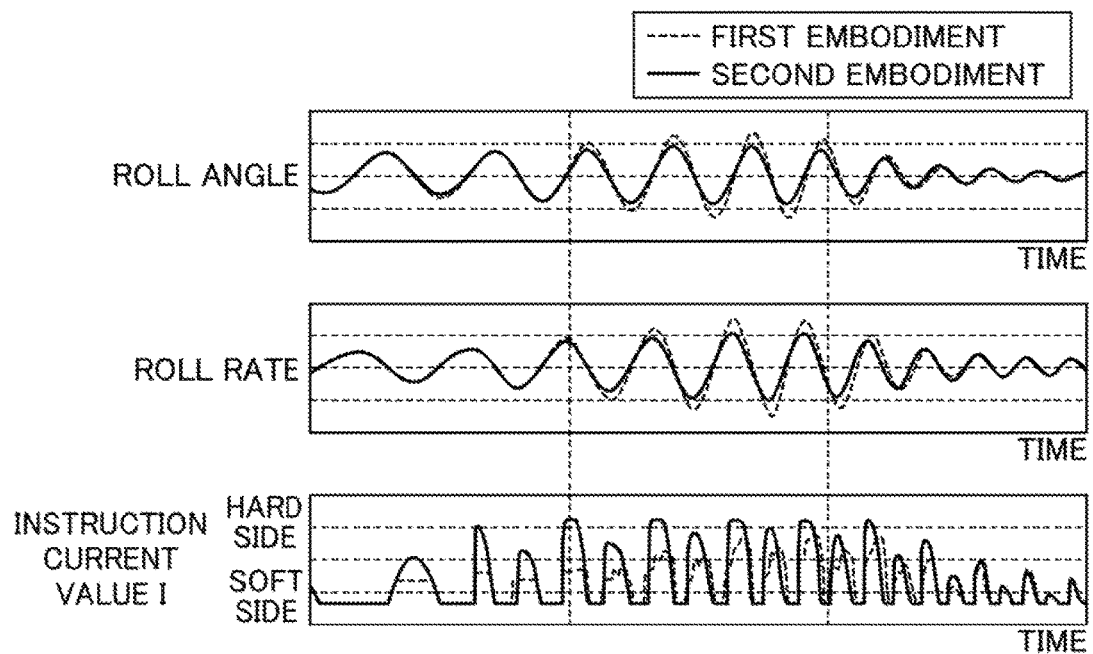
FIG. 12 illustrates characteristic lines indicating temporal changes of a roll angle, a roll rate, and an instruction current value in the first and second embodiments.

The vehicle suspension control apparatus according to the second embodiment is configured in the above-described manner, and can improve a damping effect when a roll oscillation occurs. A simulation at the time of occurrence of a roll oscillation was conducted with respect to the suspension control apparatuses according to the first and second embodiments to confirm such a damping effect. FIG. 12 illustrates a result thereof. In this simulation, road surfaces of reverse phases were input to the left and right wheels by log sweep to cause a roll.

As illustrated in FIG. 12, the first embodiment tends to have a large roll oscillation, but the second embodiment can acquire a similar damping effect to the conventional technique since the second embodiment hardly limits the target damping coefficient C when a roll oscillation occurs.

Figure 13:
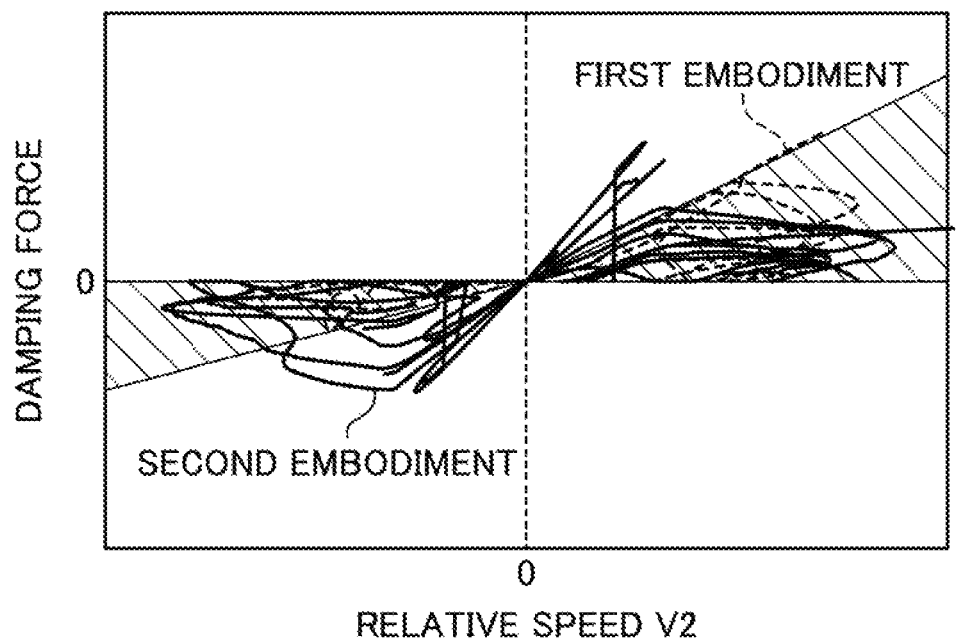
FIG. 13 illustrates characteristic lines indicating a relationship between a relative speed and a damping force when a roll oscillation occurs in the first and second embodiments.

Further, FIG. 13 illustrates a relationship between a damping force based on the corrected damping coefficient Ca and the relative speed V2 at the time of execution of a simulation in which road surfaces of reverse phases were input to the left and right wheels in a similar manner to the above-described simulation. In the first embodiment, even when a roll oscillation occurs, the upper limit of the target damping coefficient C is limited according to the relative speed V2, whereby the inclination of the damping force relative to the relative speed V2 is reduced, and the damping force changes within a shaded region in FIG. 13.

On the other hand, the second embodiment sets a smaller correction amount so as to increase a damping coefficient according to a roll oscillation, i.e., increases the upper limit of the target damping coefficient C, compared to the first embodiment. Therefore, when a roll occurs, it is possible to increase the inclination of the damping force relative to the relative speed V2, whereby it can be understood that the damping force is generated beyond the shaded region in FIG. 13. As a result, according to the second embodiment, it is possible to increase a roll damping effect compared to the first embodiment.

In this manner, the thus-configured second embodiment can also provide a substantially similar effect to the first embodiment. Further, according to the second embodiment, when it is determined that a roll oscillation of the vehicle body 1 is larger than a predetermined level based on a detection signal of the roll oscillation sensor 21, the minimum value selector 19 and the maximum damping coefficient map 24 set a smaller correction amount to calculate a corrected damping coefficient Ca, which is acquired by limiting the upper limit of the target damping coefficient C, within a range that does not exceed the constant maximum damping coefficient $C_{max}$ regardless of the relative speed V2. Therefore, it is possible to variably set the corrected damping coefficient Ca according to a roll oscillation state, and therefore possible to secure a sufficient roll damping performance by increasing the upper limit of the target damping coefficient C when a roll oscillation occurs.

On the other hand, when a roll oscillation does not occur, the minimum value selector 19 and the maximum damping coefficient map 24 set a larger correction amount to reduce the upper limit of the target damping coefficient C when the relative speed V2 is a low speed. As a result, it is possible to prevent a sudden change in the damping force to improve ride comfort.

In the second embodiment, the roll oscillation sensor 21 constitutes an orientation change detection device that detects a change in the orientation of the vehicle body 1. However, the present invention is not limited thereto. The orientation change detection device may be constituted by any device capable of detecting a change in the orientation of the vehicle body. For example, a change in the orientation may be detected with use of a sensor signal such as a lateral acceleration, a longitudinal acceleration, steering, braking, and the like. Further, the second embodiment is configured so as to set the maximum damping coefficient map according to an oscillation level of a roll, and set the damping coefficient maximum value from this map. However, the second embodiment may be configured in such a manner that a correction gain (larger than 1) is set according to a level of a roll oscillation, and increase a value of the maximum damping coefficient map according to an oscillation level of a roll.

Figure 14:
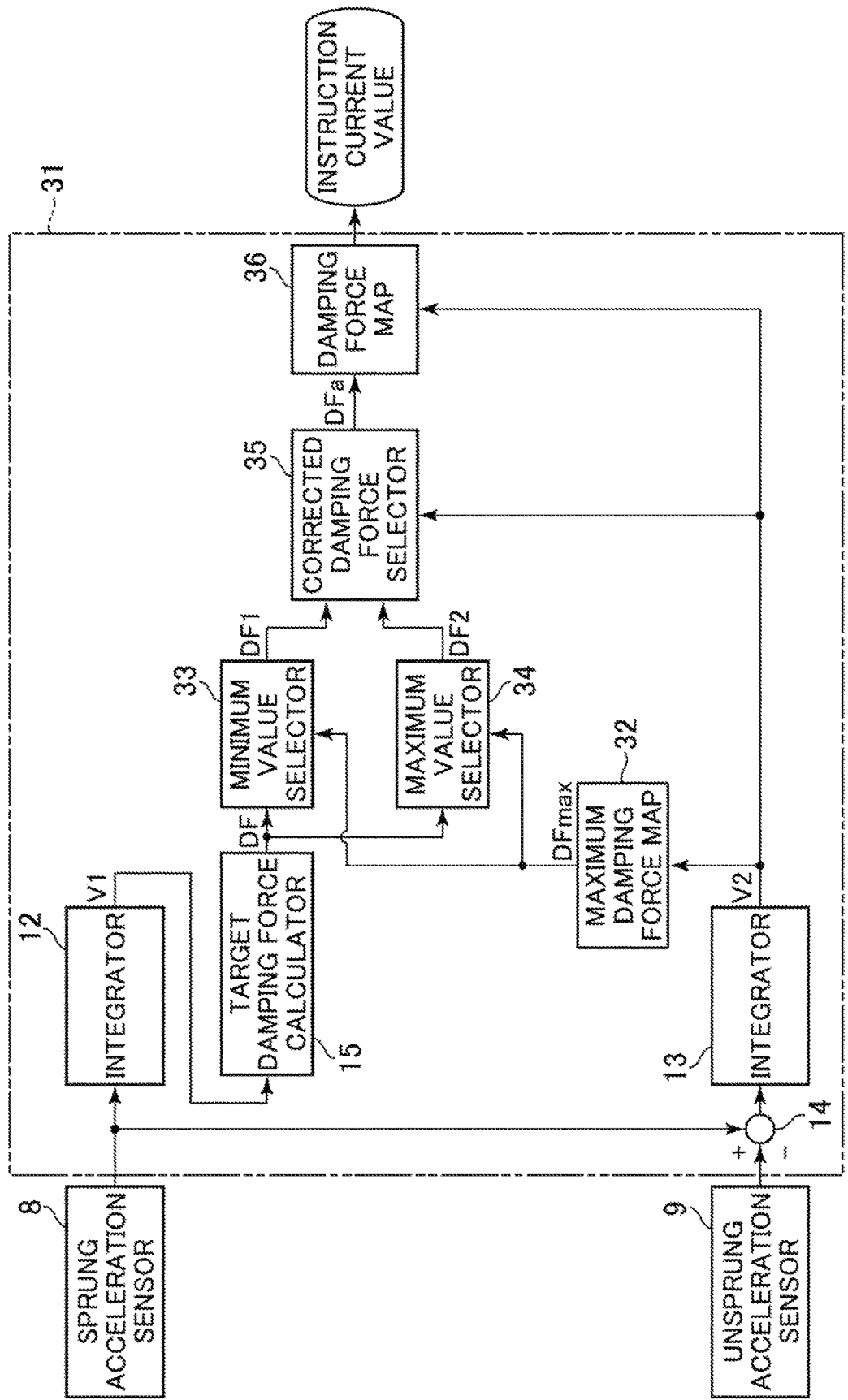
FIG. 14 is a block diagram illustrating a controller according to a third embodiment.
Figure 15:
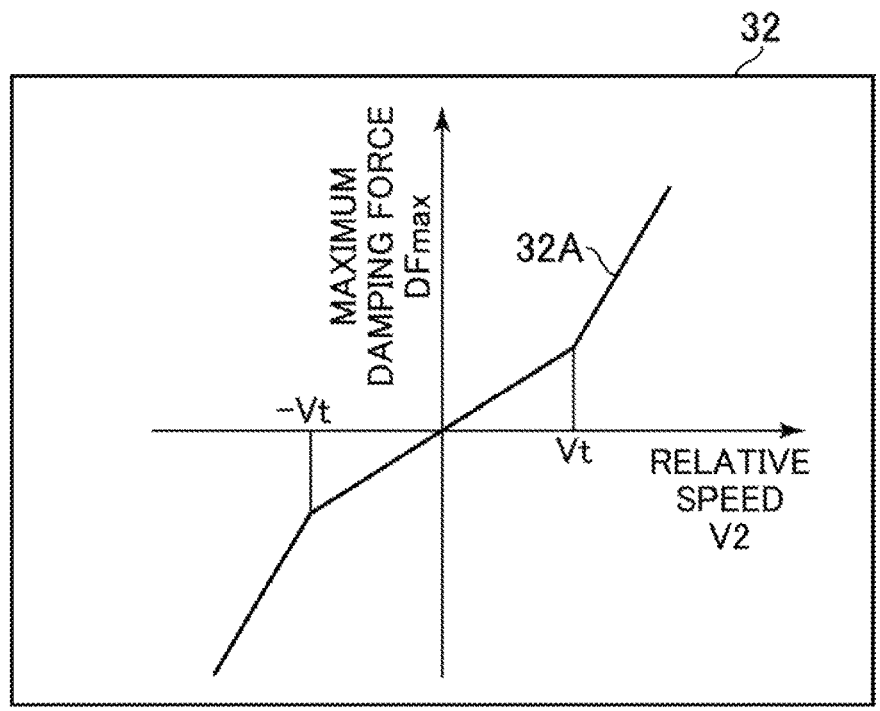
FIG. 15 illustrates a maximum damping force map in FIG. 14.
Figure 16:
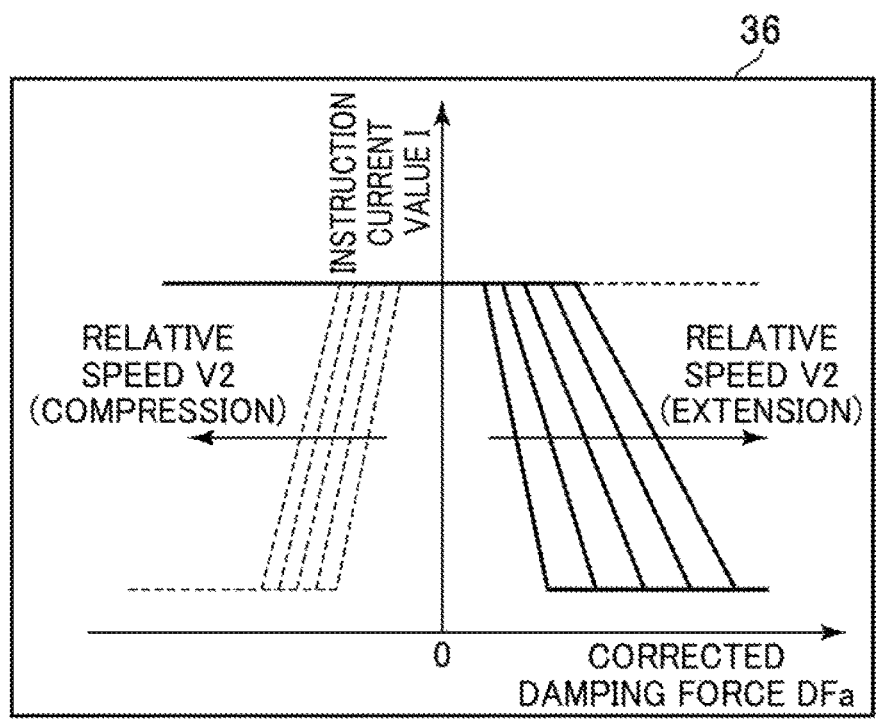
FIG. 16 illustrates a damping force map in FIG. 14.

Next, FIGS. 14 to 16 illustrate a third embodiment of the present invention. The third embodiment is characterized by being configured so as to calculate a corrected damping force, which is acquired by reducing a target damping force, when a relative speed is a low speed, and output a control signal corresponding to this corrected damping force to the shock absorber. In the following description of the third embodiment, similar components to the first embodiment will be identified by the same reference numerals, and descriptions thereof will be omitted below.

A controller 31 is realized by, for example, a microcomputer in a similar manner to the controller 11 according to the first embodiment, and constitutes the control device that controls the shock absorber 6 based on detected signals from the acceleration sensors 8 and 9. The input side of this controller 31 is connected to the acceleration sensors 8 and 9, and the like. The output side of the controller 31 is connected to the actuator 7 of the shock absorber 6, and the like. Further, the controller 13 includes a storage section (not illustrated). A maximum damping force map 32, which outputs a maximum damping force $DF_{max}$ based on the relative speed V2 illustrated in FIG. 15, and a damping force map 36 illustrated in FIG. 16 are stored in the storage section.

The controller 31 includes the integrators 12 and 13, the subtractor 14, the target damping force calculator 15, the maximum damping force map 32, a minimum value selector 33, a maximum value selector 34, a corrected damping force selector 35, and the damping force map 36.

As illustrated in FIG. 15, the maximum damping force map 32 includes a characteristic line 32A that represents a relationship between the relative speed V2 and the maximum damping force $DF_{max}$, and outputs the maximum damping force $DF_{max}$ based on the relative speed V2. At this time, the maximum damping force $DF_{max}$ is set to a value within a range that does not exceed the maximum value of the damping force that the shock absorber 6 can generate. Further, the maximum damping force $DF_{max}$ is set to a smaller value when the relative speed V2 is lower than the predetermined threshold value Vt, and is set to a larger value when the relative speed V2 is higher than the threshold value Vt.

More specifically, when the relative speed V2 is lower than the threshold value Vt (−Vt<V2<Vt), the characteristic line 32A has a smaller inclination of the maximum damping force $DF_{max}$ relative to the relative speed V2, whereby the maximum damping force $DF_{max}$ based on the relative speed V2 is also set to a smaller value. On the other hand, when the relative speed V2 at the extension side (the positive side) is higher than the threshold value Vt (V2>Vt) or when the relative speed V2 at the compression side (the negative side) is higher than the threshold value Vt (V2<−Vt), the characteristic line 32A has a larger inclination of the maximum damping force $DF_{max}$ relative to the relative speed V2, whereby the maximum damping force $DF_{max}$ based on the relative speed V2 is also set to a larger value. Both the target damping force DF and the maximum damping force $DF_{max}$ have positive values for the relative speed V2 at the positive side, and have negative values for the relative speed V2 at the negative side.

The minimum value selector 33 compares the target damping force DF output from the target damping force calculator 15 and the maximum damping force $DF_{max}$ output from the maximum damping force map 32, and selects a smaller one of these damping forces DF and $DF_{max}$ to output it as a first damping force DF1. This minimum value selector 33 limits the target damping force DF when the relative speed V2 is at the positive side to a smaller value than the maximum damping force $DF_{max}$. Therefore, when the target damping force DF at the positive side is smaller than the maximum damping force $DF_{max}$ at the positive side (DF<$DF_{max}$), the minimum value selector 33 outputs a value of the target damping force DF as the first damping force DF1. When the target damping force DF at the positive side is smaller than the maximum damping force $DF_{max}$ at the positive side ($DF_{max}$<DF), the minimum value selector 33 outputs a value of the maximum damping force $DF_{max}$ as the first damping force DF1.

The maximum value selector 34 compares the target damping force DF output from the target damping force calculator 15 and the maximum damping force $DF_{max}$ output from the maximum damping force map 32, and selects a larger one of these damping forces DF and $DF_{max}$ to output it as a second damping force DF2. This maximum value selector 34 limits the target damping force DF when the relative speed V2 is at the negative side to a larger value than the maximum damping force $DF_{max}$ (a value close to zero), i.e., limits an absolute value of the target damping force DF to a smaller value than an absolute value of the maximum damping force $DF_{max}$.

Therefore, when the target damping force DF at the native side is larger than the maximum damping force $DF_{max}$ at the negative side (DF>$DF_{max}$), the maximum value selector 34 outputs a value of the target damping force DF as the second damping force DF2. When the maximum damping force $DF_{max}$ at the negative side is larger than the target damping force DF at the negative side ($DF_{max}$>DF), the maximum value selector 34 outputs a value of the maximum damping force $DF_{max}$ as the second damping force DF2.

The corrected damping force selector 35 selects any one of the first damping force DF1 from the minimum value selector 33 and the second damping force DF2 from the maximum value selector 34 based on the relative speed V2, and outputs the selected one as a corrected damping force DFa. More specifically, the corrected damping force selector 35 selects the first damping force DF1 when the relative speed V2 is at the positive side, and selects the second damping force DF2 when the relative speed V2 is at the negative side. As a result, the corrected damping force selector 35 outputs a corrected damping force DFa by which an absolute value of the target damping force DF is set to be smaller than an absolute value of the maximum damping force $DF_{max}$.

Therefore, the maximum damping force map 32, the minimum value selector 33, the maximum vale selector 34, and the corrected damping force selector 35 constitute the correction section that calculates the corrected damping force DFa, which is acquired by reducing the target damping force DF, when the relative speed V2 is a low speed.

The damping force map 36 constitutes the control signal output section, and outputs the instruction current value I as a control signal corresponding to the corrected damping force DFa. As illustrated in FIG. 16, the damping force map 36 variably sets the relationship between the corrected damping force DFa and the instruction current value I according to the relative speed V2, and is generated based on experiment data by the inventors of the present invention. Then, the damping force map 36 identifies the instruction current value I for adjusting the damping force characteristic of the shock absorber 6 based on the corrected damping force DFa from the corrected damping force selector 35 and the relative speed V2 from the integrator 13, and outputs this instruction current value I to the actuator 7 of the shock absorber 6.

Further, the damping force map 36 outputs a control signal (the instruction current value I) for controlling the shock absorber 6 in such a manner that the damping force adjustable shock absorber operates in conformity with the Skyhook theory. More specifically, when the relative speed V2 is at the positive side (the extension side), first, the damping force map 36 selects one line from a plurality of characteristic lines indicated by solid lines illustrated in FIG. 16 according to a value of the relative speed V2. In FIG. 16, the selected characteristic line shifts to the right according to an increase in the relative speed V2. Next, the damping force map 36 acquires the instruction current value I corresponding to a value of the corrected damping force DFa on the selected characteristic line. Geometrically, a line is drawn from the value of the corrected damping force DFa perpendicularly, an intersection point between the drawn line and the selected characteristic line is acquired, and an intersection point between a line horizontally drawn from it and a vertical axis is acquired as the instruction current value I.

In this manner, when the relative speed V2 is at the positive side (the extension side) and the sprung speed V1 is at the positive side (the upward side), the instruction current value I is reduced according to an increase in the corrected damping force DFa to set the damping force characteristic to the hard characteristic. When the relative speed V2 is at the positive side (the extension side) and the sprung speed V1 is at the negative side (the downward side), the instruction current value I is maintained at a constant large value regardless of the value of the corrected damping force DFa to set the damping force characteristic to the soft characteristic.

On the other hand, when the relative speed V2 is at the positive side (the compression side), the damping force map 36 selects one line from a plurality of characteristic lines indicated by broken lines illustrated in FIG. 16 according to a value of the relative speed V2. In FIG. 16, the selected characteristic line shifts to the left according to an increase in the relative speed V2. Next, the damping force map 36 acquires the instruction current value I corresponding to a value of the corrected damping force DFa on the selected characteristic line.

In this manner, when the relative speed V2 is at the negative side (The compression side) and the sprung speed V1 is at the positive side (the upward side), the instruction current value I is maintained at a constant large value regardless of a value of the corrected damping force DFa to set the damping force characteristic to the soft characteristic. When the relative speed V2 is at the negative side (the compression side) and the sprung speed V1 is at the negative side (the downward side), the instruction current value I is reduced according to a reduction in the corrected damping force DFa (an increase in the minus direction) to set the damping force characteristic to the hard characteristic.

In this manner, the thus-configured third embodiment can also acquire a substantially similar effect to the first embodiment. Further, according to the third embodiment, the controller 31 calculates the corrected damping force DFa, which is acquired by reducing the target damping force DF, when the relative speed V2 is a low speed, like the relative speed when the stroke of the shock absorber 6 reverses, and outputs the instruction current value I corresponding to this corrected damping force DFa to the shock absorber 6. As a result, it is possible to reduce occurrence of a strange noise and a jerk due to a sudden change in the damping force.

On the other hand, when the relative speed V2 is a high speed, the controller 31 calculates the corrected damping force DFa in which the limitation of the target damping force DF is eased compared to the limitation when the relative speed V2 is a low speed, and outputs the instruction current value I corresponding to the larger value of the corrected damping force DFa. As a result, when the relative speed V2 is a high speed, it is possible to generate a larger damping force by the shock absorber 6 to secure a sufficient damping performance, thereby improving ride comfort.

The third embodiment has been described based on the example in which it is employed to a similar configuration to the first embodiment, but may be employed to a similar configuration to the second embodiment.

Figure 17:
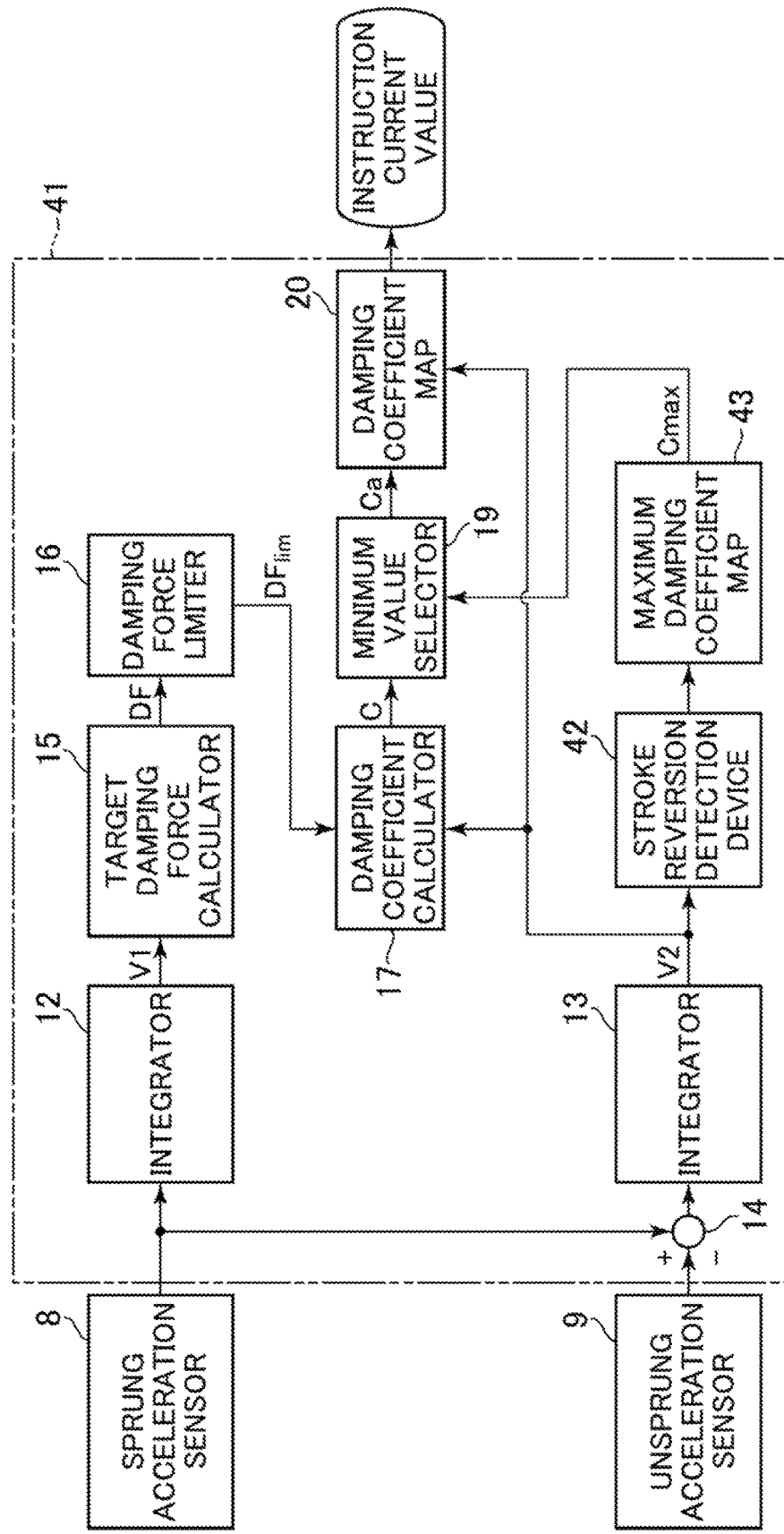
FIG. 17 is a block diagram illustrating a controller according to a modification example.

Further, the controller 11 according to the first embodiment is configured to output the corrected damping coefficient Ca, which is acquired by limiting the target damping force C, when the relative speed V2 is a low speed regardless of whether the shock absorber 6 is in a state before or after stroke reversion. However, the present invention is not limited thereto. The controller 11 may be configured to further include a stroke reversion determination device 42 that determines whether stroke reversion occurs between an extension stroke and a compression stoke of the shock absorber 6 based on the relative speed V2, like a controller 41 according to a modification example illustrated in FIG. 17, and output the corrected damping coefficient Ca, which is acquired by limiting the target damping coefficient C to a smaller value, only at a departure from the stroke reversion based on a determination result of this stroke reversion determination device 42.

In this case, the stroke reversion determination device 42, for example, calculates an increase rate of the relative speed V2, and determines that stroke reversion occurs in a region where multiplication of the relative speed V2 by the calculated increase rate results in a positive value, i.e., an absolute value of the relative speed V2 is maximized from immediately after stroke reversion, and determines that stroke reversion does not occur in another region.

Figure 18:
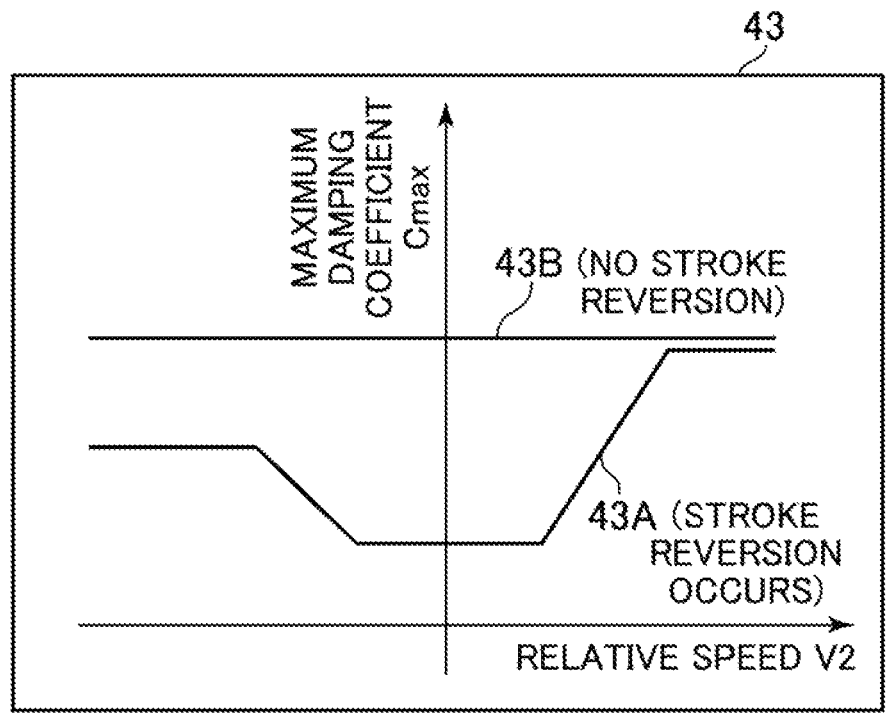
FIG. 18 illustrates a maximum damping coefficient map in FIG. 17.

Further, as illustrated in FIG. 18, the maximum damping coefficient map 43 includes a characteristic line 43A substantially similar to the characteristic line 18a in the maximum damping coefficient map 18 according to the first embodiment, and further includes a characteristic line 43B according to which the limitation of the target damping coefficient C is smaller and the maximum damping coefficient $C_{max}$ is larger compared to the characteristic line 43A.

Then, when stroke reversion occurs, the maximum damping coefficient map 43 outputs the maximum damping coefficient $C_{max}$ based on the relative speed V2 with use of the characteristic line 43A similar to the characteristic line 18A illustrated in FIG. 4. At this time, the maximum damping coefficient $C_{max}$ is set to a smaller value when the relative speed is lower than the predetermined threshold value Vt, and is set to a larger value when the relative speed V2 is higher than the threshold value Vt.

On the other hand, when stroke reversion does not occur, the maximum damping coefficient map 43 outputs the maximum damping coefficient $C_{max}$ based on the relative speed V2 with use of the characteristic line 43B. At this time, the characteristic line 43B is, for example, set based on the maximum value of the damping force that the shock absorber 6 can generate, and the maximum damping coefficient $C_{max}$ is maintained at a constant value regardless of the relative speed V2.

According to this modification example, it is possible to improve ride comfort by securing a sufficient damping performance until before stroke reversion while preventing a sudden change in the damping force at a departure from the stroke reversion. This modification example can be also employed to the second and third embodiments in a similar manner.

The first and second embodiments are configured to output the corrected damping coefficient, which is acquired by limiting the target damping coefficient, not only in the case that the relative speed V2 is a low speed but also in the case that the relative speed V2 is a high speed. However, the present invention is not limited thereto, and may be configured to, for example, output the corrected damping coefficient, which is acquired by limiting the target damping coefficient, only when the relative speed V2 is a low speed, and output the target damping coefficient without limiting it as the corrected damping coefficient when the relative speed V2 is a high speed.

Similarly, the third embodiment is configured to output the corrected damping force, which is acquired by limiting the target damping force, only in the case that the relative speed V2 is a low speed but also in the case that the relative speed V2 is a high speed. However, for example, the third embodiment may be configured to, for example, output the corrected damping force, which is acquired by limiting the target damping force, only when the relative speed V2 is a low speed, and output the target damping force without limiting it as the corrected damping force when the relative speed V2 is a high speed.

According to the first and third embodiments, the maximum damping coefficient map 18 and the maximum damping force map 32 are configured to determine whether the relative speed V2 is a low speed by comparing the relative speed V2 and the threshold value Vt. However, the present invention is not limited thereto. For example, the maximum damping coefficient map 18 and the maximum damping force map 32 may determine whether the relative speed is a low speed based on a change rate of the relative speed or a change rate of a change rate of the relative speed. This configuration can be also employed to the second embodiment and the modification example.

According to the above-described respective embodiments, the vehicle body side vertical movement detection device is constituted with use of the sprung acceleration sensor 8 and the integrator 12. However, the vehicle body side vertical movement detection device may be constituted with use of a sprung speed sensor that directly detects a vertical speed (the sprung speed V1) on the vehicle body 1.

According to the above-described respective embodiments, the relative speed detection device is constituted by the sprung acceleration sensor 8, the unsprung acceleration sensor 9, the subtractor 14, and the integrator 13. However, the relative speed detection device may be constituted with use of a sprung speed sensor, an unsprung speed sensor, and a subtractor. Alternatively, the relative speed detection device may be constituted with use of a speed sensor that directly detects the relative speed V2 between the vehicle body 1 and the wheel 2. Further alternatively, the relative speed detection device may be constituted with use of a displacement sensor that detects a relative displacement between the vehicle body 1 and the wheel 2, and a differentiator. Then, the vertical movement detection device may be constituted by combining the vehicle side vertical movement detection device constituted by any of the above-described various methods, and the relative speed detection device. Further alternatively, the sprung speed may be acquired by the sprung acceleration sensor 8 and the integrator, and the relative speed detection device may be constituted by the vehicle height sensor and a differentiator. Further alternatively, the sprung speed may be estimated by an observer from a value acquired by the vehicle height sensor, and the relative speed detection device may be constituted by the vehicle height sensor and a differentiator. Further alternatively, with use of only the single sprung acceleration sensor 8, a sprung speed at one wheel is acquired by integrating the acceleration value obtained at the sprung acceleration sensor 8 by the integrator, and a sprung speed of each wheel may be acquired based on the acquired sprung speed and signals from two rate sensors mounted to detect a roll and a pitch, and the relative speed at each wheel may be acquired by an observer based on the sprung speed of each wheel.

Further, the above-described embodiments have been described based on the example that the present invention is employed to the controller 11, 22, 31, or 41 that controls the shock absorber 6 of the suspension apparatus 4 based on the Skyhook theory. However, the present invention may be employed for a controller that performs roll feedback control, pitch feedback control, bilinear optimal control, H infinity control, and the like. The present invention can be applied to any kind of basic control logic, but especially, the present invention can increase a calculation speed to improve responsiveness by being used together with bilinear optimal control. Further, the present invention can stabilize control.

Next, the invention carried out by the above-described respective embodiments will be described. According to one embodiment of the present invention, the controller includes the target damping force calculator configured to calculate a target damping force based on a detection result of the vertical movement detection device, the correction section configured to calculate a corrected damping force, which is acquired by reducing the target damping force, when a relative speed is a low speed between the sprung side and the unsprung side of the damping force adjustable shock absorber, and a control signal output section configured to output a control signal corresponding to the corrected damping force to the damping force adjustable shock absorber.

Therefore, when the relative speed is a low speed, like the relative speed when the stroke of the shock absorber reverses between an extension stroke and a compression stroke, the controller calculates a corrected damping force, which is acquired by reducing the target damping force, and outputs a control signal corresponding to this corrected damping force to the shock absorber. As a result, it is possible to reduce occurrence of a strange noise and a jerk due to a sudden change in the damping force.

On the other hand, when the relative speed is a high speed, the controller calculates a corrected damping force in which the limitation of the target damping force is eased compared to the limitation of the target damping force when the relative speed is a low speed, and outputs a control signal corresponding to the corrected damping force having a larger value. As a result, it is possible to generate a larger damping force by the shock absorber when the relative speed is a high speed to secure a sufficient damping performance, thereby improving ride comfort.

Further, according to one embodiment of the present invention, the controller includes the target damping coefficient calculation section configured to calculate a target damping coefficient based on a detection result of the vertical movement detection device, the correction section configured to calculate a corrected damping coefficient, which is acquired by reducing an upper limit of the target damping coefficient, when a relative speed is a low speed between the sprung side and the unsprung side of the damping force adjustable shock absorber, and the control signal output section configured to output a control signal corresponding to the corrected damping coefficient to the damping force adjustable shock absorber.

At this time, the target damping coefficient corresponds to an inclination of the target damping force relative to the relative speed, whereby it is possible to prevent a sudden change in the damping force by limiting the upper limit of the target damping coefficient. Therefore, when the relative speed is a low speed, like the relative speed when the stroke of the shock absorber reverses between an extension stroke and a compression stroke, the controller calculates a corrected damping coefficient, which is acquired by reducing the upper limit of the target damping coefficient, and outputs a control signal corresponding to this corrected damping coefficient to the shock absorber. As a result, it is possible to reduce occurrence of a strange noise and a jerk due to a sudden change in the damping force.

On the other hand, when the relative speed is a high speed, the controller calculates a corrected damping coefficient according to which the upper limit of the target damping coefficient is increased compared to the upper limit when the relative speed is a low speed. In this case, when the relative speed is a high speed, like the relative speed when the shock absorber is in the middle of an extension stroke or a compression stroke, it is possible to calculate a corrected damping coefficient having a larger value without limiting the target damping coefficient as much as possible. As a result, when the relative speed is a high speed, it is possible to generate a larger damping force by the shock absorber to secure a sufficient damping performance, thereby improving ride comfort.

Further, because the target damping coefficient corresponds to an inclination of the target damping force relative to the relative speed, it is possible to generate a damping force according to the characteristic of the shock absorber by limiting the target damping coefficient. As a result, it is possible to prevent the controller from requesting a damping force in a region that the shock absorber cannot control, and prevent a sudden change in the damping force.

Further, according to one embodiment of the present invention, the correction section includes the maximum damping coefficient according to the relative speed, and is configured to correct the target damping coefficient to the maximum damping coefficient when the target damping coefficient exceeds the maximum damping coefficient.

As a result, it is possible to set a smaller corrected damping coefficient than the maximum damping coefficient by comparing the target damping coefficient and the maximum damping coefficient. As a result, it is possible to limit the inclination of the target damping force relative to the relative speed to prevent a sudden change in the damping force.

Further, one embodiment of the present invention further includes the orientation change detection device configured to detect a change in the orientation of the vehicle body, and the correction section is configured to reduce a correction amount when determining that an orientation change occurs based on a detection result of the orientation change detection device.

At this time, if an orientation change does not occur at the vehicle body, the correction section increases the correction amount to reduce the target damping force when the relative speed is a low speed, or reduce the upper limit of the target damping coefficient. As a result, it is possible to prevent a sudden change in the damping force. On the other hand, if an orientation change occurs at the vehicle body, the correction section reduces the correction amount to ease a limitation on the target damping force and a limitation on the upper limit of the target damping coefficient. As a result, it is possible to generate a damping force against a change in the orientation of the vehicle body to secure a sufficient damping performance.

Further, according to one embodiment of the present invention, the correction section is configured to reduce the target damping coefficient or the target damping force only at a departure from stroke reversion between an extension stroke and a compression stroke of the damping force adjustable shock absorber.

As a result, it is possible to secure a sufficient damping performance until before stroke reversion to improve ride comfort while preventing a sudden change in the damping force at the time of a departure from stroke reversion.

Further, according to one embodiment of the present invention, the correction section may determine whether the relative speed is a low speed based on a change rate of the relative speed or a change rate of a change rate of the relative speed.

Further, according to one embodiment of the present invention, the correction section is configured to set the corrected damping force so as to be smaller than a damping force that the damping force adjustable shock absorber can generate, or set to the corrected damping coefficient so as to be smaller than a damping coefficient that the damping force adjustable shock absorber can generate.

As a result, even when the control signal output section outputs a control signal corresponding to the corrected damping force or the corrected damping coefficient to the shock absorber, the shock absorber can generate a damping force corresponding to the corrected damping force or the corrected damping coefficient. Therefore, it is possible to prevent the controller from requesting a damping force in a region that the shock absorber cannot control, and also prevent a sudden increase in the damping force.

According to the suspension control apparatus of the above-described embodiments, it is possible to prevent a sudden increase in the damping force at the time of stroke reversion of the shock absorber.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2012-218554 filed on Sep. 28, 2012. The entire disclosure of Japanese Patent Applications No. 2012-218554 filed on Sep. 28, 2012 including specification, claims, drawings and summary is incorporated herein by reference in its entirety.

What is claimed is:

1. A suspension control apparatus comprising:
a damping force adjustable shock absorber disposed between a sprung side and an unsprung side of a vehicle and capable of adjusting a damping force to be generated;
a vertical movement detection device configured to detect a state regarding a vertical movement of the vehicle; and
a controller configured to output a control signal for controlling the damping force to be generated by the damping force adjustable shock absorber based on a detection result of the vertical movement detection device,
wherein the controller is configured to:
calculate a target damping force based on a detection result of the vertical movement detection device,
calculate a corrected damping force which is smaller than an absolute value of the target damping force in a low-speed region in which a relative speed between the sprung side and the unsprung side of the vehicle is a low speed, an absolute value of the corrected damping force being set so that the corrected damping force increases as the relative speed increases and that an inclination of the corrected damping force to the relative speed when the relative speed is in a first range of the low-speed region is smaller than the inclination of the corrected damping force to the relative speed when the relative speed is in a second range of the low speed region in which the relative speed is higher than in the first range, and
output the control signal corresponding to the corrected damping force to the damping force adjustable shock absorber.

2. The suspension control apparatus according to claim 1, further comprising an orientation change detection device configured to detect an orientation change of a vehicle body of the vehicle, wherein the controller sets a smaller amount as a correction amount to reduce the target damping force when it is determined that the orientation change occurs based on a detection result of the orientation change detection device.

3. The suspension control apparatus according to claim 1, wherein the controller reduces the target damping force only at a departure from stroke reversion between an extension stroke and a compression stroke of the damping force adjustable shock absorber.

4. The suspension control apparatus according to claim 1, wherein the controller determines whether the relative speed is a low speed based on a change rate of the relative speed or a change rate of a change rate of the relative speed.

5. The suspension control apparatus according to claim 1, wherein the controller sets the corrected damping force so as to be smaller than a damping force that the damping force adjustable shock absorber can generate.

6. A suspension control apparatus comprising:
a damping force adjustable shock absorber disposed between a sprung side and an unsprung side of a vehicle and capable of adjusting a damping force to be generated;
a vertical movement detection device configured to detect a state regarding a vertical movement of the vehicle; and
a controller configured to output a control signal for controlling a damping force to be generated by the damping force adjustable shock absorber based on a detection result of the vertical movement detection device,
wherein the controller is configured to:
calculate a target damping coefficient based on a detection result of the vertical movement detection device,
calculate a corrected damping coefficient, which is acquired by reducing an upper limit of the target damping coefficient, in a low-speed region in which a relative speed between the sprung side and the unsprung side of the vehicle is a low speed, the corrected damping coefficient being set so that the damping force increases as the relative speed increases and that the corrected damping coefficient when the relative speed is in a first range of the low-speed region is smaller than the corrected damping coefficient when the relative speed is in a second range of the low-speed region in which the relative speed is higher than in the first range, and
output the control signal corresponding to the corrected damping coefficient to the damping force adjustable shock absorber.

7. The suspension control apparatus according to claim 6, wherein controller compares the target damping coefficient with the corrected damping coefficient and outputs the control signal based on a smaller one of the target damping coefficient and the corrected damping coefficient.

8. The suspension control apparatus according to claim 6, wherein the controller uses bilinear optimal control.

9. The suspension control apparatus according to claim 6, further comprising an orientation change detection device configured to detect an orientation change of a vehicle body of the vehicle, wherein the controller sets a smaller amount as a correction amount to reduce the target damping coefficient when it is determined that the orientation change occurs based on a detection result of the orientation change detection device.

10. The suspension control apparatus according to claim 6, wherein the controller reduces the target damping coefficient only at a departure from stroke reversion between an extension stroke and a compression stroke of the damping force adjustable shock absorber.

11. The suspension control apparatus according to claim 6, wherein the controller determines whether the relative speed is a low speed based on a change rate of the relative speed or a change rate of a change rate of the relative speed.

12. The suspension control apparatus according to claim 6, wherein the controller sets the corrected damping coefficient so as to be smaller than a damping coefficient that the damping force adjustable shock absorber can generate.

* * * * *